(12) United States Patent
Konieczny et al.

(10) Patent No.: US 10,142,610 B2
(45) Date of Patent: Nov. 27, 2018

(54) METHOD FOR SUB-RANGE BASED CODING A DEPTH LOOKUP TABLE

(71) Applicant: Huawei Technologies Co., Ltd., Shenzhen (CN)

(72) Inventors: Jacek Konieczny, Munich (DE); Fabian Jaeger, Aachen (DE); Mathias Wien, Aachen (DE)

(73) Assignee: Huawei Technologies Co., Ltd., Shenzhen (CN)

( * ) Notice: Subject to any disclaimer, the term of this patent is extended or adjusted under 35 U.S.C. 154(b) by 481 days.

(21) Appl. No.: 14/852,288

(22) Filed: Sep. 11, 2015

(65) Prior Publication Data
US 2016/0007005 A1 Jan. 7, 2016

Related U.S. Application Data

(63) Continuation of application No. PCT/EP2013/055179, filed on Mar. 13, 2013.

(51) Int. Cl.
*H04N 13/161* (2018.01)
*H04N 19/597* (2014.01)
(Continued)

(52) U.S. Cl.
CPC ......... *H04N 13/161* (2018.05); *H04N 19/136* (2014.11); *H04N 19/157* (2014.11); *H04N 19/463* (2014.11); *H04N 19/597* (2014.11); *H04N 19/70* (2014.11); *H04N 2013/0081* (2013.01); *H04N 2213/005* (2013.01)

(58) Field of Classification Search
CPC .... H04N 19/597; H04N 19/463; H04N 19/70; H04N 19/136; H04N 19/48; H04N 19/157
See application file for complete search history.

(56) References Cited

U.S. PATENT DOCUMENTS

| 2005/0053295 A1 | 3/2005 | Holcomb |
| 2009/0110073 A1 | 4/2009 | Wu et al. |
| 2015/0350623 A1* | 12/2015 | Zhang .................. H04N 19/597 375/240.12 |

FOREIGN PATENT DOCUMENTS

CN 101841719 A 9/2010

OTHER PUBLICATIONS

Merkle, "Description of Core Experiment 6 (CE6) on Depth Intra Coding," Joint Collaborative Team on 3D Video Coding Extension Development of ITU-T SG 16 WP 3 and ISO/IEC JTC 1/SC 29/WG 11, JCT3V-C1106, 3rd Meeting, Geneva, CH, International Telecommunication Union, Geneva, Switzerland (Jan. 17-23, 2013).
(Continued)

*Primary Examiner* — Obafemi O Sosanya
(74) *Attorney, Agent, or Firm* — Leydig, Voit & Mayer, Ltd.

(57) ABSTRACT

The invention relates to a method (200) for sub-range based coding a depth lookup table (300), the depth lookup table comprising depth values of a 3D video sequence, the depth values being constrained within a range (301), the method comprising: partitioning (201) the range (301) into a plurality of sub-ranges, a first sub-range (303) comprising a first set of the depth values and a second sub-range (305) comprising a second set of the depth values; and coding (203) the depth values of each of the sub-ranges of the depth lookup table (300) separately according to a predetermined coding rule.

28 Claims, 14 Drawing Sheets

(51) Int. Cl.
- *H04N 19/70* (2014.01)
- *H04N 19/463* (2014.01)
- *H04N 19/136* (2014.01)
- *H04N 19/157* (2014.01)
- *H04N 13/00* (2018.01)

(56) References Cited

OTHER PUBLICATIONS

Novell et al., "Error Resilient Variable Length Encoder/Decoder for Low Power Wireless Video Codecs," 42$^{nd}$ Midwest Symposium on Circuits and Systems, vol. 2, pp. 1086-1089, Institute of Electrical and Electronics Engineers, New York, New York (1999).

Jager, "3D-CE6.h related: Model-based Intra Coding for Depth Maps using a Depth Lookup Table," Joint Collaborative Team on 3D Video Coding Extension Development of ITU-T SG 16 WP 3 and ISO/IEC JTC 1/SC 29/WG 11, 1$^{st}$ Meeting: Stockholm, Sweden, Document JCT2-A0010 (Jul. 16-20, 2012).

Jager, "3D-CE6.h: Simplified Depth Coding with an optional Depth Lookup Table," Joint Collaborative Team on 3D Video Coding Extension Development of ITU-T SG 16 WP 3 and ISO/IEC JTC 1/SC 29/WG 11, 2$^{nd}$ Meeting: Shanghai, China, Document JCT3V-B0036 (Oct. 13-19, 2012).

Tech et al., "3D-HEVC Test Model 2," Joint Collaborative Team on 3D Video Coding Extension Development of ITU-T SG 16 WP 3 and ISO/IEC JTC 1/SC 29/WG 11, 2$^{nd}$ Meeting: Shanghai, China, Document JCT3 V-B1005_d0 (Oct. 13-19, 2012).

Lim et al., "3D-CE6 Related: Improved Depth Lookup Table (Slice-layer Signalling)," Joint Collaborative Team on 3D Video Coding Extension Development of ITU-T SG 16 WP 3 and ISO/IEC JTC 1/SC 29/WG 11, 3$^{rd}$ Meeting: Geneva, Switzerland, Document JCT3V-C0093 (Jan. 17-23, 2013).

Zhang et al., "3D-CE6.h related: An efficient coding method for DLT in 3DVC," Joint Collaborative Team on 3D Video Coding Extension Development of ITU-T SG 16 WP 3 and ISO/IEC JTC 1/SC 29/WG 11, 3$^{rd}$ Meeting: Geneva, Switzerland, Document JCT3V-C0142 (Jan. 17-23, 2013).

* cited by examiner

METHOD FOR SUB-RANGE BASED CODING A DEPTH LOOKUP TABLE

CROSS-REFERENCE TO RELATED APPLICATION

This application is a continuation of International Patent Application No. PCT/EP2013/055179, filed on Mar. 13, 2013, which is hereby incorporated by reference in its entirety.

TECHNICAL FIELD

The present invention relates to a method and apparatus for coding a depth lookup table (DLT) and a method and apparatus for decoding a depth lookup table, especially in the field of computer vision, in particular in 3D video processing and 3D video coding.

BACKGROUND

In 3D video, depth data is usually represented as set of depth maps that correspond to each frame of the texture video. Intensity of each point of the depth map describes the distance from the camera of the visual scene represented by this point. Alternatively, a disparity map may be used, which values are inversely proportional to the ones of the depth map and can be used to derive the depth maps.

In 3D video coding, a depth map for each view needs to be encoded besides the conventional video data. These depth maps show different signal characteristics compared to video data as they contain piecewise smooth regions bounded by strong edges. As depth maps are often estimated from texture data or are pre-processed, their histogram might be relatively sparse. As a result, a Depth Lookup Table (DLT) was proposed [F. Jäger, "3D-CE6.h Results on Simplified Depth Coding with an optional Depth Lookup Table," Joint Collaborative Team on 3D Video Coding Extension Development (JCT-3V) of ITU-T VCEG and ISO/IEC MPEG, Shanghai, China, JCT3V-B0036, 2012] to exploit the histogram characteristics by only signaling difference indexes of the DLT instead of signaling the residual depth values themselves. By this approach the bit depth of these residual values can be reduced, which consequently results in higher coding efficiency.

The DLT is constructed at the encoder by analyzing the histogram of the original, uncompressed depth map. This DLT is afterwards transmitted to the decoder to allow for the mapping of indexes to actual depth values. Histogram values of the depth maps may vary over time and therefore there is a requirement for an update mechanism. Moreover, in a multi-view coding scenario, multiple depth maps may have different depth map histograms and in these cases such an update mechanism is also beneficial to the overall coding performance.

In the latest specification of the 3D extension for High Efficiency Video Coding [G. Tech, K. Wegner, Y. Chen, S. Yea, "3D-HEVC test model 2," Document of Joint Collaborative Team on 3D Video Coding Extension Development, JCT3V-B1005, October, 2012], the DLT is only sent once per sequence in Sequence Parameter Set (SPS), separately for all views. This approach keeps the overhead for the DLT signaling relatively low.

It was also proposed to signal the DLT in the slice header of each I-Slice of the base view [I. Lim, H. C. Wey, and D. S. Park, "3D-CE6.h Related: Improved depth lookup table (DLT)," Joint Collaborative Team on 3D Video Coding Extension Development (JCT-3V) of ITU-T VCEG and ISO/IEC MPEG, Geneva, Switzerland, JCT3V-O0093, 2013]. In this approach, the DLT values are updated more regularly in the temporal direction to allow for histogram changes over time. In this case, all the dependent views inherit the base view's DLT as it is assumed that the depth map histogram over all views is the same.

Also, another method to signal DLT values, called range constrained bit map (RCBM) coding 100 as depicted in FIG. 1, was proposed in [Kai Zhang, Jicheng An, Shawmin Lei, "3D-CE6.h related: An efficient coding method for DLT in 3DVC", Document of Joint Collaborative Team on 3D Video Coding Extension Development, JCT3V-O0142, January, 2013]. The method 100 uses signaling of range of depth values that are present in DLT (see FIG. 1): min_dlt_value and diff_max_dlt_value are coded as unsigned integer to constrain the value range of DLT. The smallest value in DLT is min_dlt_value, and the largest is MaxDlt-Value, which equals to min_dlt_value+diff_max_dlt_value. Then, the binary string bit_map_flag is used to signal whether the depth value within the range is present in the DLT or not. If a bit in the bit_map_flag is equal to 1 the depth value corresponding to this position in the binary string belongs to or occurs in the DLT, otherwise the depth value does not belong to respectively does not occur in the DLT.

Prior art encoding methods for DLT signaling do not fully utilize characteristics of the signal and, consequently, there is a need to further increase coding efficiency of DLT.

SUMMARY

It is the object of the invention to provide an improved coding/decoding technique for a depth lookup table.

This object is achieved by the features of the independent claims. Further implementation forms are apparent from the dependent claims, the description and the figures.

The invention is based on the finding that an improved coding/decoding technique for a depth lookup table can be provided by a using multi-range DLT representation. Instead of signaling all values in the current DLT as one range, the original range of values is divided into sub-ranges, e.g. two or more, and each of the sub-ranges is signaled. Furthermore, a variant of the multi-range DLT representation is presented in which an adaptive selection whether to use single- or multi-range DLT representation is made and a single flag is utilized to signal which representation has been chosen.

A new technique of Depth Lookup Table coding/decoding is presented that reduces the required bitrate for the DLT coding. As depth map characteristics may vary significantly between different sequences and even within the same sequence (between frames and between views), that technique provides high flexibility for coding/decoding the DLT.

In order to utilize the characteristics of DLT lookup tables, the presented technique introduces a new method for DLT coding/decoding that uses multi-range DLT representation of signaled DLT values on top of range-based representation like e.g. binary string used in range constrained bit map (RCBM) prior-art solution. Instead of signaling only one range of DLT values, the whole range of values that need to be signaled for DLT is divided into multiple, e.g. two or more sub-ranges.

The invention is based on the further finding that an improved coding/decoding technique for a depth lookup table can be provided by using additionally inter-DLT or DLT-prediction. Instead of dividing the range of the current DLT directly, the range of a difference DLT of the current DLT, which comprises only the differences between the current DLT and a reference DLT, is divided into a plurality of sub-ranges. Due to similarities between the current DLT and the reference DLT, the difference DLT is typically very sparse and shows larger gaps. This enables further encoding gains when applying the multi-range DLT coding.

In order to describe the invention in detail, the following terms, abbreviations and notations will be used:
HEVC—High-Efficiency Video Coding
CU—Coding Unit
DLT—Depth Lookup Table
RAP—Random Access Point
SEI—Supplemental Enhancement Information
SH—Slice Header
SPS—Sequence Parameter Set
PPS—Picture Parameter Set
video sequence a set of subsequent frames presenting motion picture.
3D video signal comprising two texture views and their corresponding depth or disparity maps.
visual scene real world or synthetic scene that is represented in the 3D video.
depth map a gray scale picture in which value of every point of the picture determines distance to the camera of the visual scene represented by this point. Alternatively, a disparity map may be used to represent or derive the depth map, which values are inversely proportional to the ones of the depth map.
texture view a video acquired in a specified viewpoint, containing information about color and texture of the visual scene; usually represented in RGB or YUV format.
random access
point defined point in the structure of video sequence from which decoder is able to start decoding the sequence without the knowledge of the previous part of the video stream.
SPS set of parameters sent in form of organized message containing basic information required to properly decode the video stream; must be signaled at the beginning of every random access point.
PPS set of parameters sent in form of organized message containing basic information required to properly decode a picture in the video sequence.
picture a structure of the video sequence containing whole picture of the video sequence; also referred to as a frame.
slice a structure of the video sequence containing a part of whole picture of the video sequence.
slice header set of parameters describing the slice, sent at the beginning of the slice.
CU a basic coding structure of the video sequence of a pre-defined size, containing a part of a picture (e.g. 64×64 pixels).
I-slice slice in which all coding units are intra-predicted, so no reference to other pictures is allowed.
SEI message that can be signaled in stream of video sequence, containing additional or optional information about the video sequence, coding tools etc.

According to a first aspect, the invention relates to a method for sub-range based coding a depth lookup table, the depth lookup table comprising depth values of a 3D video sequence, the depth values being constrained within a range, the method comprising: partitioning the range into a plurality of sub-ranges, a first sub-range comprising a first set of the depth values and a second sub-range comprising a second set of the depth values; coding the depth values of each of the sub-ranges of the depth lookup table separately according to a predetermined coding rule.

In a realization form, a sequence comprises one of a frame, a GOP and a slice.

In a realization form, the partitioning the range into a plurality of sub-ranges is partitioning the range into two sub-ranges, one of the two sub-ranges being the first sub-range and another one of the two sub-ranges being the second sub-range.

In a realization form, a plurality of sub-ranges each comprising a set of the depth values is used.

In a realization form, the coding the depth values is applied to the current DLT and/or to a difference DLT.

The new presented method of Depth Lookup Table coding/decoding provides high flexibility for the encoder/decoder while reducing the required bitrate for the DLT at the same time. As depth map characteristics may vary significantly between different sequences and even within the same sequence (between frames and between views), high flexibility for coding/decoding the DLT is provided by this method.

In a first possible implementation form of the method according to the first aspect, the method comprises: signaling a position of the first sub-range in the range of the depth values of the depth lookup table.

By signaling a position of the first sub-range in the range of the depth values of the depth lookup table, the coding of the depth lookup table can be achieved very efficiently.

In a second possible implementation form of the method according to the first implementation form of the first aspect, the method comprises: signaling a position of the second sub-range in the range of the depth values of the depth lookup table by using an offset to the position of the first sub-range.

By signaling a position of the second sub-range in the range of the depth values of the depth lookup table by using an offset to the position of the first sub-range, the coding is reduced to indicating that offset which results in a very efficient coding.

In a third possible implementation form of the method according to the first implementation form or according to the second implementation form of the first aspect, the method comprises: signaling a width of a sub-range by using a parameter indicating the width of that sub-range.

By signaling the width of a sub-range by using a parameter indicating the width of that sub-range, the method can be flexibly adjusted to the respective DLT.

In a fourth possible implementation form of the method according to the first aspect as such or according to any of the preceding implementation forms of the first aspect, an occurrence of the depth values of each of the sub-ranges of the depth lookup table in the depth lookup table are signaled as binary strings.

By using such binary strings, the coding is reduced to indicating a presence or non-presence of a depth value in the DLT which is a very efficient coding.

In a fifth possible implementation form of the method according to the first aspect as such or according to any of the preceding implementation forms of the first aspect, the depth values of each of the sub-ranges of the depth lookup table are coded by using a range constrained bit map coding, e.g. according to 3D Video Coding Extension Development of ITU-T and ISO/IEC standardization.

When coding the depth values comprises a range constrained bit map coding according to 3D Video Coding Extension Development of ITU-T and ISO/IEC standardization, the method is compliant to the standards.

In a sixth possible implementation form of the method according to the first aspect as such or according to any of the preceding implementation forms of the first aspect, the partitioning the range into a plurality of sub-ranges is based on a selection criterion.

When partitioning the range into a plurality of sub-ranges is based on a selection criterion, the partitioning can be flexibly selected.

In a seventh possible implementation form of the method according to the sixth implementation form of the first aspect, the method comprises: signaling a result of the selection by using a flag.

Using a flag for signaling a result is easy to implement.

In an eighth possible implementation form of the method according to the first aspect as such or according to any of the preceding implementation forms of the first aspect, for a depth lookup table belonging to a predetermined group of depth lookup tables, the range is partitioned into a fixed number of sub-ranges if a coding type indicates non-adaptive coding; and the range is partitioned into a selectable number of sub-ranges if the coding type indicates adaptive coding.

By using the coding type, the method can be flexibly adjusted to the characteristics of the depth map or depth lookup table and/or to the requirements of the user.

In a ninth possible implementation form of the method according to the eighth implementation form of the first aspect, the method comprises: selecting the coding type with respect to the predetermined group of depth lookup tables.

When selecting the coding type with respect to the predetermined group of depth lookup tables, the selecting can depend on the group of DLTs.

In a tenth possible implementation form of the method according to the eighth implementation form or according to the ninth implementation form of the first aspect, the number of the sub-ranges is selected based on an optimization criterion with respect to a cost of coding the depth values of each of the sub-ranges.

When the number of the sub-ranges is selected based on an optimization criterion with respect to a cost of coding the depth values of each of the sub-ranges, the cost for implementing the method can be minimized.

In an eleventh possible implementation form of the method according to the tenth implementation form of the first aspect, a selection based on the optimization criterion comprises: setting the initial range as sub-range; partitioning the sub-ranges into new sub-ranges with respect to largest gaps between depth values of the depth lookup table; and if a cost of signaling the sub-ranges is greater than a cost of signaling the new sub-ranges and a number of the sub-ranges is below a predetermined number, proceed with the partitioning the sub-ranges, wherein the new sub-ranges are applied as the sub-ranges in the partitioning, else finish with providing the non-partitioned sub-ranges.

The sub-ranges can thus be flexibly adjusted to the gaps between the depth values.

In a twelfth possible implementation form of the method according to any of the eighth to the eleventh implementation forms of the first aspect, the number of sub-ranges and/or the coding type is signaled within one of a sequence parameter set (SPS) message, picture parameter set (PPS) message, slice header (SH) message, coding unit (CU) message, picture header (PH) message, supplemental enhancement information (SEI) message.

The method can therefore be flexibly adjusted to different kinds of messages.

The coding type indicates non-adaptive coding or adaptive coding.

In a thirteenth possible implementation form of the method according to any of the eighth to the twelfth implementation forms of the first aspect, the method comprises: using a dedicated supplemental enhancement information (SEI) message comprising a message header, the message header comprising a message type indicating that the dedicated supplemental enhancement information (SEI) message comprises a signaling of the coding type and/or a signaling of the number of sub-ranges; wherein the dedicated supplemental enhancement information (SEI) message further comprises a value of the coding type and/or a value of the number of sub-ranges.

According to a second aspect, the invention relates to an apparatus for sub-range based coding a depth lookup table, the depth lookup table comprising depth values of a 3D video sequence, the depth values being constrained within a range, the apparatus comprising: a partitioner configured for partitioning the range into a plurality of sub-ranges, a first sub-range comprising a first set of the depth values and a second sub-range comprising a second set of the depth values; a coder configured for coding the depth values of each of the sub-ranges of the depth lookup table separately according to a predetermined coding rule.

The apparatus for sub-range based coding a DLT provides high flexibility for the encoder/decoder while reducing the required bitrate for the DLT at the same time. As depth map characteristics may vary significantly between different sequences and even within the same sequence, high flexibility for coding/decoding the DLT is provided.

In a realization form, a sequence comprises one of a frame, a GOP and a slice.

In a realization form, the partitioning the range into a plurality of sub-ranges is partitioned in two sub-ranges, one of the two sub-ranges being the first sub-range and another one of the two sub-ranges being the second sub-range.

In a realization form, a plurality of sub-ranges each comprising a set of the depth values is used.

In a realization form, the coding the depth values is applied to the current DLT and/or to the difference DLT.

The explanations provided for the first aspect and its implementations and realizations apply correspondingly for the second aspect and its implementations and realizations.

According to a third aspect, the invention relates to a method for providing a representation of a depth lookup table associated to at least a part of a 3D picture, the method comprising: providing the representation of the depth lookup table based on depth value information comprised in a first sub-range representation of the representation of the depth lookup table, which comprises depth value information associated to a first sub-range of a range of depth value information of the representation of the depth lookup table, and based on depth value information comprised in a second sub-range representation of the representation of the depth lookup table, which comprises depth value information associated to a second sub-range of the range of depth value information of the representation of the depth lookup table.

Providing a representation of a depth lookup table is also denoted as decoding an encoded version of a depth lookup table.

The new presented method of Depth Lookup Table decoding provides high flexibility for the decoder while reducing the required bitrate for the DLT at the same time. As depth map characteristics may vary significantly between different sequences and even within the same sequence the decoding performance is significantly improved by a decoding based on depth value information comprised in the first and the second sub-ranges of the representation of the depth lookup table.

In a first possible implementation form of the method according to the third aspect, the first sub-range and the second sub-range are different.

In a second possible implementation form of the method according to the third aspect, the first sub-range and the second sub-range do not overlap.

In a third possible implementation form of the method according to the third aspect, the first sub-range and the second sub-range do not form consecutive sub-ranges with regard to the range of depth value information.

In a fourth possible implementation form of the method according to the third aspect, the first sub-range and the second sub-range do not form neighboring sub-ranges with regard to the range of depth value information.

In a fifth possible implementation form of the method according to the third aspect, the range of depth value information of the representation of the depth lookup table is larger than a sum of the first sub-range and the second sub-range.

In a sixth possible implementation form of the method according to the fifth implementation form of the third aspect, the method further comprises: adding, based on a predetermined reconstruction algorithm, to the representation of the depth lookup table information, in particular depth value information, about non-occurring depth values, which is not comprised in the first sub-range representation of the representation of the depth lookup table and not comprised in the second sub-range representation of the representation of the depth lookup table.

In a realization form the adding is used for reconstructing the "gap" between the 2 sub-ranges and other non-occurring or non-valid ranges. Information means information that there are no depth values between the two ranges.

In a seventh possible implementation form of the method according to the third aspect as such or according to any of the preceding implementation forms of the third aspect, the method further comprises: receiving a bitstream comprising the first sub-range representation of the representation of the depth lookup table and the second sub-range representation of the representation of the depth lookup table separately multiplexed; and demultiplexing the bitstream to obtain the first sub-range representation of the representation of the depth lookup table and the second sub-range representation of the representation of the depth lookup table.

In a realization form, the first sub-range representation of the representation of the depth lookup table and the second sub-range representation of the representation of the depth lookup table are separately encoded.

In an eighth possible implementation form of the method according to the third aspect as such or according to any of the preceding implementation forms of the third aspect, the method further comprises: analyzing a multi-range indicator, the multi-range indicator indicating whether the representation of the depth lookup table is encoded as a plurality of separate sub-range representations; and providing, in case the multi-range indicator indicates that the representation of the depth lookup table is encoded as a plurality of sub-range representations, the representation of the depth lookup table associated to at least the part of the 3D picture based on depth value information comprised in the plurality of sub-range representations of the representation of the depth lookup table, the plurality of sub-range representations of the representation of the depth lookup table (current-DTL) comprising at least the first sub-range representation and the second sub-range representation of the representation of the depth lookup table.

In a realization form, the analyzing the multi-range indicator comprises parsing for a multi-range indicator, for example a flag, single or more bits in a bitstream, the bitstream comprising data associated to the representation of the depth lookup table.

In a ninth possible implementation form of the method according to the eighth implementation form, the multi-range indicator is comprised in a coding unit coding level, a slice header coding level, a picture header coding level, a picture parameter set coding level, a SPS coding level or a SEI coding level.

In a tenth possible implementation form of the method according to the third aspect as such or according to any of the preceding implementation forms of the third aspect, the method further comprises: analyzing a multi-range indicator, for example comprised in a coding unit coding level, a slice header coding level, a picture header coding level, a picture parameter set coding level, a SPS coding level or a SEI coding level, the type indicator indicating whether the representation of the depth lookup table is encoded as a plurality of sub-range representations and/or indicating the number of ranges or sub-ranges the representation of the depth lookup table is encoded as; and providing, in case the multi-range indicator indicates that the representation of the depth lookup table is encoded as multiple sub-range representations, the representation of the depth lookup table (current-DLT) associated to at least the part of the 3D picture representation based on depth value information comprised in the plurality of sub-range representations of the representation of the depth lookup table (current-DTL), the plurality of sub-range representations of the representation of the depth lookup table (current-DTL) comprising at least the first sub-range representation and the second sub-range representation of the representation of the depth lookup table (current-DTL).

In a realization form, the analyzing the multi-range indicator comprises parsing for a multi-range indicator, e.g. a flag, single or more bits in a bitstream, the bitstream comprising data associated to the representation of the depth lookup table.

In an eleventh possible implementation form of the method according to the tenth implementation form, the multi-range indicator is comprised in a coding unit coding level, a slice header coding level, a picture header coding level, a picture parameter set coding level, a SPS coding level or a SEI coding level.

In a twelfth possible implementation form of the method according to any of the eighth to the eleventh implementation forms, the method further comprises: receiving a bitstream comprising the multi-range indicator and the plurality of sub-range presentations of the representation of the depth lookup table.

In a thirteenth possible implementation form of the method according to the third aspect as such or according to any of the preceding implementation forms of the third aspect, the representation of the depth lookup table is a binary string representation of the depth lookup table, wherein the depth value information comprises a string of binary values, wherein a position of a binary value of the string of binary values in the string of binary values is associated to a depth value of the corresponding depth lookup table and wherein a length of the string of binary values corresponds to a size of the range of depth value information; and wherein the first sub-range representation of the representation of the depth lookup table is a first sub-range of the binary string representation of the depth lookup table, and wherein the second sub-range representation of the representation of the depth lookup table is a second sub-range of the binary string representation of the depth lookup table.

The range is a sequence of consecutive values with a length equal to the number of consecutive values, in particular consecutive binary values.

The thirteenth implementation form and the subsequent implementation forms of the method according to the third aspect cover both: difference and non-difference DLT coding with binary strings.

In a fourteenth possible implementation form of the method according to the thirteenth implementation form of the third aspect, a length of the first sub-range of the binary string representation corresponds to a size of the first sub-range of depth value information, and a length of the second sub-range of the binary string representation corresponds to a size of the second sub-range of depth value information.

In a fifteenth possible implementation form of the method according to the thirteenth or according to the fourteenth implementation form of the third aspect, the first sub-range of binary values of the binary string representation of the depth lookup table and the second sub-range of binary values of the binary string representation of the depth lookup table are separated by at least one binary value of the binary string representation of the depth lookup table.

The term "separated by at least one binary value" means "being different and not overlapping", i.e., there is a gap in between.

In a sixteenth possible implementation form of the method according to the fourteenth or according to the fifteenth implementation form of the third aspect, the method further comprises: adding, based on a predetermined reconstruction algorithm, to the binary string representation of the depth lookup table binary values not comprised in the first sub-range representation of the representation of the depth lookup table and not comprised in the second sub-range representation of the representation of the depth lookup table.

The binary string representation of the depth lookup table covers both difference and non-difference.

The seventeenth implementation form and the subsequent implementation forms of the method according to the third aspect focus on non-difference DLT.

In a seventeenth possible implementation form of the method according to any of the fourteenth to the sixteenth implementation forms of the third aspect, a first binary value ("1") of a binary value of the string of binary values indicates the occurrence of the depth value in the corresponding reference lookup table.

In an eighteenth possible implementation form of the method according to any of the fourteenth to the seventeenth implementation forms of the third aspect, the binary string representation of the depth lookup table corresponds to a range constrained bit map, RCBM, coded binary string.

The nineteenth implementation form and the subsequent implementation forms of the method according to the third aspect focus on difference DLT.

In a nineteenth possible implementation form of the method according to any of the fourteenth to the eighteenth implementation forms of the third aspect, the representation of the depth lookup table is a difference binary string representation of the depth lookup table, wherein a first binary value ("1") of a binary value of the string of binary values of the difference binary string representation indicates the occurrence of a depth value in the depth lookup table, which does not occur in a reference depth lookup table, and indicates the occurrence of a depth value occurring in the reference lookup table, which does not occur in the depth lookup table, wherein a length of the string of binary values corresponds to a size of the range of depth value information, and wherein the first sub-range representation of the representation of the depth lookup table is a first sub-range of the difference binary string representation of the depth lookup table, and wherein the second sub-range representation of the representation of the depth lookup table is a second sub-range of the difference binary string representation of the depth lookup table.

In a realization form, the difference lookup table is not created.

In a twentieth possible implementation form of the method according to the nineteenth implementation form of the third aspect, the method further comprises: providing a binary string representation of the depth lookup table associated to at least the part of the 3D picture by adding to the binary string representation of the depth lookup table depth value information, which is present in the difference binary string representation of the depth lookup table and which is not present in a binary string representation of the reference depth lookup table; and by copying to the binary string representation of the depth lookup table depth value information of the binary string representation of the reference DLT, which is not present in the difference binary string representation of the depth lookup table.

In a realization form, the providing the binary string representation of the depth lookup table associated to at least the part of the 3D picture is derived from the decoder of "inter DLT prediction" application.

In a twenty-first possible implementation form of the method according to the nineteenth or according to the twentieth implementation form of the third aspect, the method further comprises: providing a binary string representation of the depth lookup table associated to at least the part of the 3D picture by applying one of a logical XOR operation and a logical XNOR operation to the binary values of the difference binary string representation and the binary values of the reference binary string representation associated to the same depth values to obtain binary values of the binary string representation of the depth lookup table.

In a twenty-second possible implementation form of the method according to any of the nineteenth to the twenty-first implementation forms of the third aspect, the difference binary string representation of the depth lookup table corresponds to a range constrained bit map, RCBM, coded difference binary string, and the binary string representation of the reference depth lookup table corresponds to a range constrained bit map, RCBM, coded reference binary string.

In a twenty-third possible implementation form of the method according to any of the nineteenth to the twenty-second implementation forms of the third aspect, the reference depth lookup table is a depth lookup table associated to other 3D pictures associated to other views, to other 3D pictures associated to other views and/or time instances of a 3D video sequence comprising the 3D picture, or to other parts of the (same) 3D picture, for a corresponding part of another 3D picture associated to other views and/or time instances, wherein a part of the 3D picture comprises a slice, a coding unit, a coding block, or a macro block of the 3D picture.

In a twenty-fourth possible implementation form of the method according to any of the nineteenth to the twenty-third implementation forms of the third aspect, the method further comprises: analyzing a difference coding indicator, for example comprised in a coding unit coding level, a slice header coding level, a picture header coding level, a picture parameter set coding level, a SPS coding level or a SEI coding level, the difference coding indicator indicating a type of difference encoding and/or the reference depth lookup table used for obtaining the difference binary string representation of the depth lookup table; selecting a binary string representation of a reference depth lookup table according to the type indicator; and providing the representation of a depth lookup table associated to at least the part of the 3D according to any of the nineteenth to the twenty-third implementation forms of the third aspect.

In a realization form, the analyzing a difference coding indicator comprises parsing for a difference coding indicator (flag, single or more bits) in a bitstream, the bitstream comprising data associated to the representation of the depth lookup table.

According to a fourth aspect, the invention relates to an apparatus comprising a processor for performing the method according to the third aspect as such or according to any of the preceding implementation forms of the third aspect.

The explanations provided for the third aspect and its implementations and realizations apply correspondingly for the fourth aspect and its implementations and realizations.

According to a fifth aspect, the invention relates to a method for coding a representation of a depth lookup table associated to at least a part of a 3D picture, the method comprising: partitioning a range of depth value information of the representation of the depth lookup table into a plurality of sub-ranges, wherein a first sub-range of the plurality of sub-ranges comprises a first set of depth value information, and a second sub-range of the plurality of sub-ranges comprises a second set of depth value information; and coding, according to a predetermined coding rule, the first sub-range of depth value information and the second sub-range of depth value information separately.

In a realization form, the sub-ranges comprise sub-ranges of depth value information. In a realization form, the first set of depth value information comprises a range of depth value information. In a realization form, the second set of depth value information comprises a range of depth value information. In a realization form, the partitioning results in obtaining a corresponding first sub-range representation and second sub-range representation of the representation of the depth lookup table.

According to a sixth aspect, the invention relates to an apparatus comprising a processor for performing the method according to the fifth aspect.

The methods, systems and devices described herein may be implemented as software in a Digital Signal Processor (DSP), in a micro-controller or in any other side-processor or as hardware circuit within an application specific integrated circuit (ASIC).

The invention can be implemented in digital electronic circuitry, or in computer hardware, firmware, software, or in combinations thereof, e.g. in available hardware of conventional mobile devices or in new hardware dedicated for processing the methods described herein.

BRIEF DESCRIPTION OF THE DRAWINGS

Further embodiments of the invention will be described with respect to the following figures, in which.

DETAILED DESCRIPTION OF EMBODIMENTS OF THE INVENTION

Figure 1:
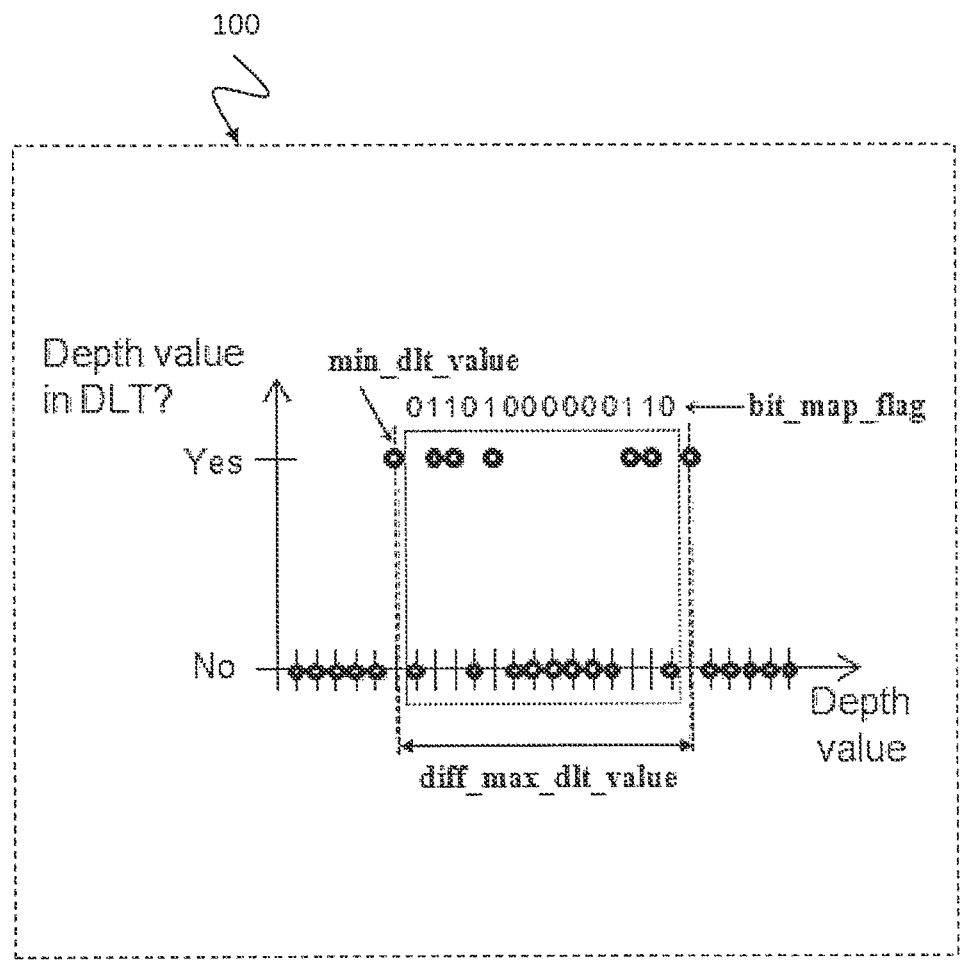
FIG. 1 shows a schematic diagram illustrating a depth lookup table (DLT) coding method 100 using conventional range constrained bit map (RCBM)

FIG. 1 shows a schematic diagram illustrating a depth lookup table (DLT) coding method 100 using conventional range constrained bit map (RCBM) as described above.

Figure 2:
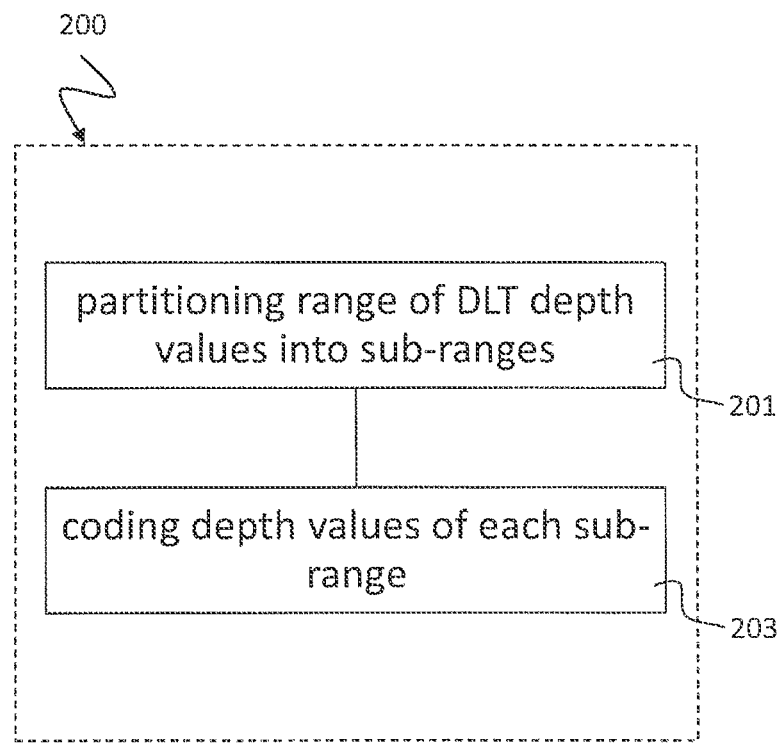
FIG. 2 shows a schematic diagram illustrating a method 200 for sub-range based coding a depth lookup table (DLT) according to an implementation form.
Figure 3:
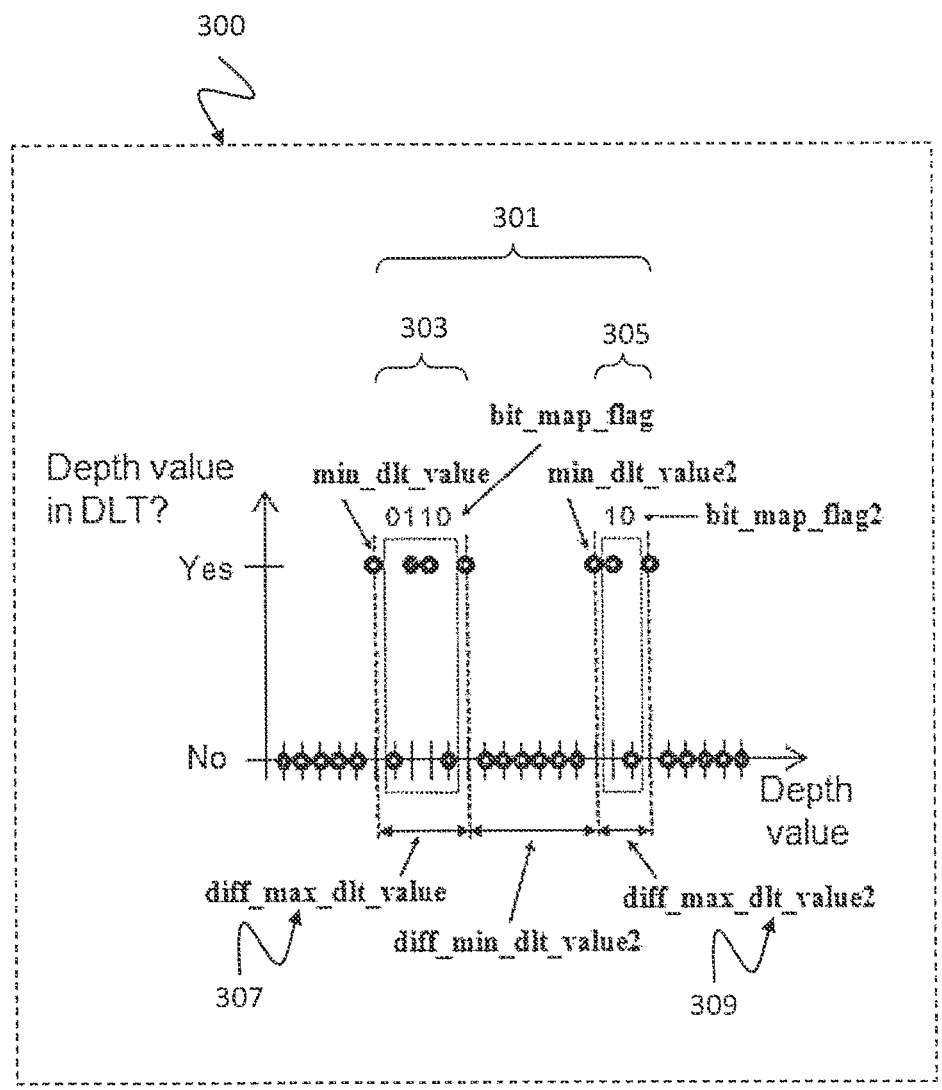
FIG. 3 shows a schematic diagram illustrating a multi-range depth lookup table (DLT) 300 to be coded by the method 200 illustrated in FIG. 2 according to an implementation form.

FIG. 2 shows a schematic diagram illustrating a method 200 for sub-range based coding a depth lookup table (DLT) 300 according to an implementation form. An exemplary realization of such a depth lookup table 300 is shown in FIG. 3 described below. The depth lookup table 300 comprises depth values of a 3D video sequence, the depth values being constrained within a range 301. The method 200 comprises partitioning 201 the range 301 into a plurality of sub-ranges, a first sub-range 303 comprising a first set of the depth values and a second sub-range 305 comprising a second set of the depth values. The method 200 comprises coding 203 the depth values of each of the sub-ranges of the depth lookup table 300 separately according to a predetermined coding rule, e.g. according to conventional RCBM coding by separately the corresponding min_dlt_value, here min_dlt_value1 and min_dlt_value2, and the corresponding diff- _max-dlt_value, here diff_max-dlt_value1 and diff_max-dlt_value2. The min_dlt_value2 can be encoded absolute like min_dlt_value1 or as offset diff-min_dlt_value2 compared to the maximum value of the first sub-range as shown in FIG. 3.

In an implementation form, the method 200 comprises signaling a position of the second sub-range 305 in the range of the depth values of the depth lookup table 300 by using an offset to the position of the first sub-range 303.

In an implementation form, the method 200 comprises signaling a width 307 of a sub-range by using a parameter indicating the width of that sub-range.

In an implementation form, an occurrence of the depth values in each of the sub-ranges of the depth lookup table 300 is signaled as binary string.

In an implementation form, the depth values of each of the sub-ranges of the depth lookup table 300 are coded by using a range constrained bit map coding according to 3D Video Coding Extension Development of ITU-T and ISO/IEC standardization.

In an implementation form, the partitioning the range 301 into a plurality of sub-ranges is based on a selection criterion.

In an implementation form, the method 200 comprises signaling a result of the selection by using a flag.

In an implementation form, for a depth lookup table 300 belonging to a predetermined group of depth lookup tables, the range 301 is partitioned into a fixed number of sub-ranges if a coding type indicates non-adaptive coding; and the range 301 is partitioned into a selectable number of sub-ranges if the coding type indicates adaptive coding.

In an implementation form, the method 200 comprises selecting the coding type with respect to the predetermined group of depth lookup tables.

In an implementation form, the number of the sub-ranges is selected based on an optimization criterion with respect to a cost of coding the depth values of each of the sub-ranges.

In an implementation form, a selection based on the optimization criterion comprises: setting the initial range as sub-range; partitioning the sub-ranges into new sub-ranges with respect to largest gaps between depth values of the depth lookup table; and if a cost of signaling the sub-ranges is greater than a cost of signaling the new sub-ranges and a number of the sub-ranges is below a predetermined number, proceed with the partitioning the sub-ranges, wherein the new sub-ranges are applied as the sub-ranges in the partitioning, else finish with providing the non-partitioned sub-ranges.

In an implementation form, the number of sub-ranges and/or the coding type is signaled within one of a sequence parameter set, SPS message, picture parameter set, PPS message, slice header, SH message, coding unit, CU message, picture header, PH message, supplemental enhancement information, SEI message.

FIG. 3 shows a schematic diagram illustrating a multi-range depth lookup table (DLT) 300 to be coded by the method 200 illustrated in FIG. 2 according to an implementation form.

FIG. 3 shows DLT coding using a multi-range DLT 300 with 2 sub-ranges 303, 305, a first sub-range 303 of a first width 307 and a second sub-range 305 of a second width 309. This brings a considerable reduction in number of bits used to represent the encoded/decoded DLT if the original range 301 of values consists of separate ranges. Such situations occur especially in the case of inter-DLT prediction and delta-DLT coding as described below with respect to FIGS. 13a and 13b.

The original range-based representation (e.g. binary string in RCBM) of the values that are signaled for the encoded/decoded DLT (or delta-DLT) is divided into multiple sub-ranges 303, 305 and each of the sub-ranges is signaled. The number of sub-ranges is pre-defined for the specified group of encoded/decoded DLT lookup tables and does not change for DLTs within the group. Consequently, this method is referred to as a "multi-range DLT coding with fixed number of sub-ranges." In this method, for each DLT, the first sub-range 303 is signaled in the same way as the original single-range 301 in the prior art according to the representation described above with respect to FIG. 1. All other sub-ranges are signaled by indicating the offset to the previous sub-range and the width of the current sub-range. The width is calculated based on the difference between minimum and maximum value in the sub-range. The values in the sub-range are signaled using the representation as in the prior art, e.g. as a binary string as known from RCBM. The original range is divided into a pre-defined number of sub-ranges, where the division points between the sub-ranges are determined by the largest gaps between the signaled values in DLT. In this sense gap between signaled DLT values means a number of neighboring depth values that are not signaled in DLT. Alternatively, any other criteria specifying the division points between the sub-ranges can be applied.

Another solution is to adaptively select if the multi-range or single-range (prior-art) DLT coding is used for each DLT within the specified group of DLT lookup tables and signal this choice for each DLT using a single flag. This method is called an "adaptive multi-range DLT coding with fixed number of sub-ranges."

In an alternative implementation form, the number of sub-ranges is adaptively selected based on a defined method of determining the best division of the original range of values into sub-ranges (the method described above with respect to FIG. 2 or any other method can be used). In such a case, the number of sub-ranges for each DLT within the specified group may differ for each DLT, as it is adaptively selected. Consequently, this number is signaled for each DLT using a specified word or code indicating the number of sub-ranges based on a pre-defined codebook. This method is called a "multi-range DLT coding with adaptive number of sub-ranges." Here, two variants are possible: the number of allowed sub-ranges contains 1 (no division into sub-ranges) or the number must be greater than 1.

In an implementation form an adaptive selection is applied selecting whether to use single- or multi-range DLT coding for both variants of the multi-range DLT coding with adaptive number of sub-ranges. As a result, for each DLT within the specified group of DLT lookup tables, an adaptive selection whether multi-range or single-range DLT coding is performed. The choice is signaled for each DLT using a single flag. This method is called an "adaptive multi-range DLT coding with adaptive number of sub-ranges."

In an implementation form, a method to determine the best division of the original range of values into sub-ranges is provided. The method comprises the following steps: Step 1: Set original range as sub-range (at the beginning there is only one sub-range); Step 2: Find the largest gap between signaled values of encoded DLT among the sub-ranges; Step 3: If the cost of signaling the position of new sub-range and signaling the new sub-ranges is smaller than cost of signaling the non-divided sub-range, save the new division, otherwise finish; Step 4: If the number of sub-ranges is equal to maximum allowed, finish, otherwise go to Step 2.

Each time the number of sub-ranges used by multi-range DLT coding is pre-defined, this number might not be suitable for encoding all DLT lookup tables within the specified group. Therefore, a method to signal the number of sub-ranges for different groups is provided. In an implementation form, the number of sub-ranges is specified in SPS, PPS, picture header, SH or CU using a dedicated syntax modification of these syntax elements. In an implementation form a dedicated SEI message is provided which consists of typical SEI message header with a SEI message type indicating that the SEI message consists of a value specifying the new number of sub-ranges used in multi-range DLT coding and the value itself.

In an implementation form, the type of multi-range DLT coding (e.g. adaptive or not) used for encoding/decoding each DLT within the specified group differs over various DLTs. In an implementation form, a method to signal the type of multi-range DLT coding used in different groups is provided. In an implementation form, the type of multi-range DLT coding is specified in SPS, PPS, picture header, SH or CU by a dedicated syntax modification of these syntax elements. In an implementation form, a dedicated SEI message is provided which consists of typical SEI message header with a SEI message type indicating that the SEI message signals the type of multi-range DLT coding and the value specifying this type itself.

Figure 4:
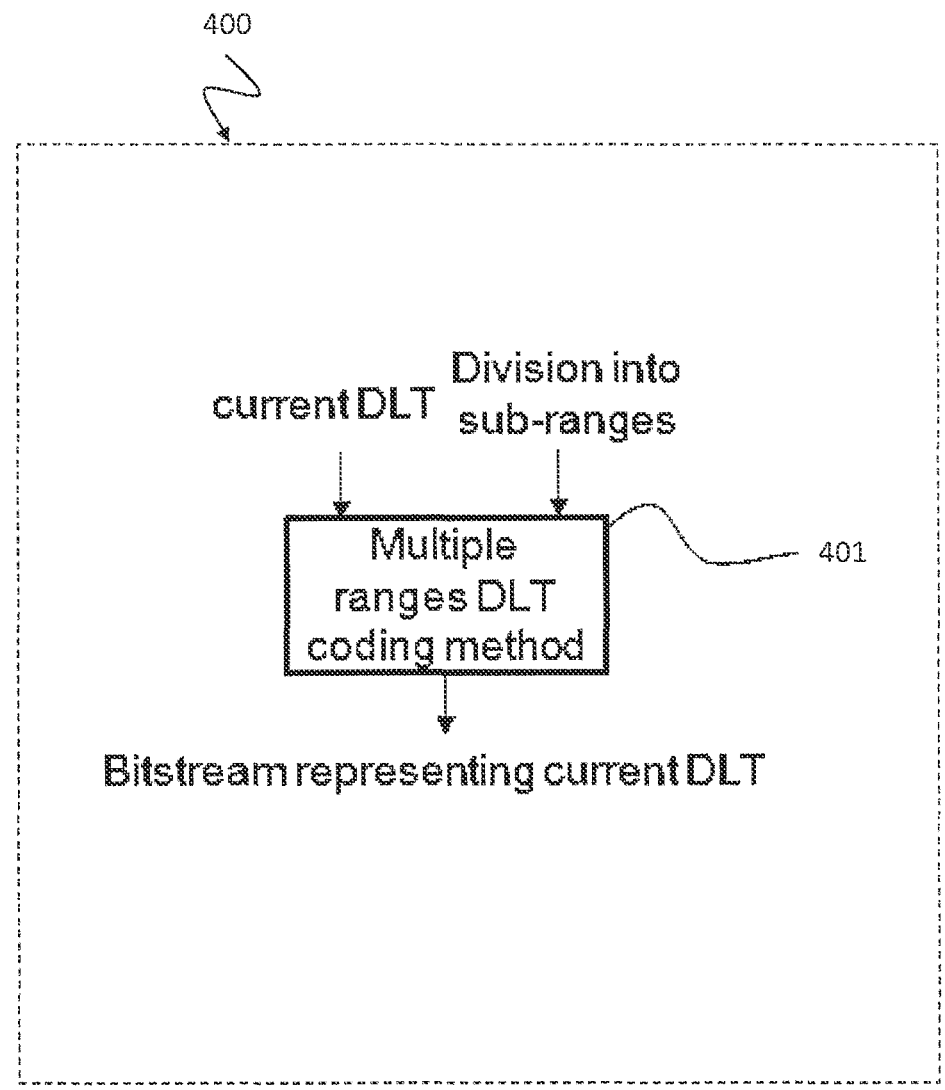
FIG. 4 shows a block diagram illustrating a method 400 for multi-range DLT coding by applying a fixed number of sub-ranges according to an implementation form.

FIG. 4 shows a block diagram illustrating a method 400 for multi-range DLT coding by applying a fixed number of sub-ranges according to an implementation form.

The method 400 comprises a functional block 401 for multi-range DLT coding which uses the "multi-range DLT coding with fixed number of sub-ranges" method as described above with respect to FIG. 3. The original range of signaled representation of depth values in DLT, i.e. either actual DLT values or prediction residuum, is divided into multiple ranges. The number of sub-ranges and division points between the sub-ranges are specified by the input data. The position of 1st range is signaled explicitly. For other ranges, the position of each range is signaled as an offset to the previous range. Each range is encoded using prior art coding, as described for example above with respect to FIG. 1.

Figure 5:
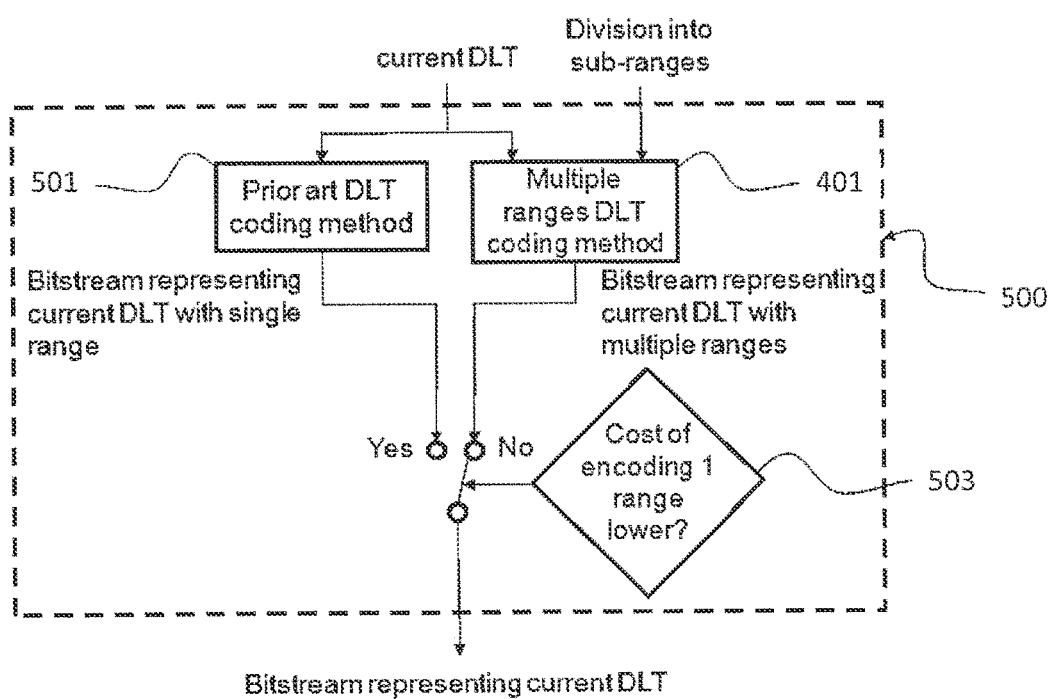
FIG. 5 shows a block diagram illustrating a method 500 for adaptive multi-range DLT coding by applying a fixed number of sub-ranges according to an implementation form.

FIG. 5 shows a block diagram illustrating a method 500 for adaptive multi-range DLT coding by applying a fixed number of sub-ranges according to an implementation form.

The method 500 comprises a functional block 500 for multi-range DLT coding using the "adaptive multi-range DLT coding with fixed number of sub-ranges" method. In block 501, DLT coding method of the input signal is performed as in the prior art as described above with respect to FIG. 1, i.e. single-range coding. In block 401, the multi-range DLT coding method is performed. In block 503, decision is made whether to use single- or multi-range coding method based on the cost of encoding of each option.

Figure 6:
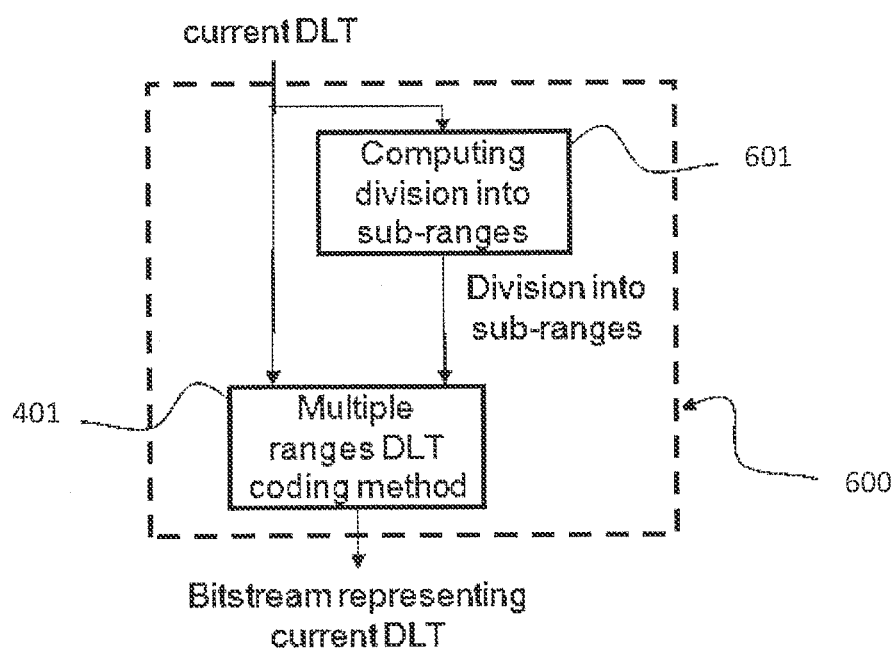
FIG. 6 shows a block diagram illustrating a method 600 for multi-range DLT coding by applying an adaptive number of sub-ranges according to an implementation form.

FIG. 6 shows a block diagram illustrating a method 600 for multi-range DLT coding by applying an adaptive number of sub-ranges according to an implementation form.

The method 600 comprises multi-range DLT coding using the "multi-range DLT coding with adaptive number of sub-ranges" method as described above with respect to FIG. 3. In block 401, multi-range DLT coding method is performed. In block 601, division of the original range of values into sub-ranges is computed based on the defined algorithm (as described with respect to FIG. 2 or any other)—number of sub-ranges and division points between the sub-ranges are determined.

Figure 7:
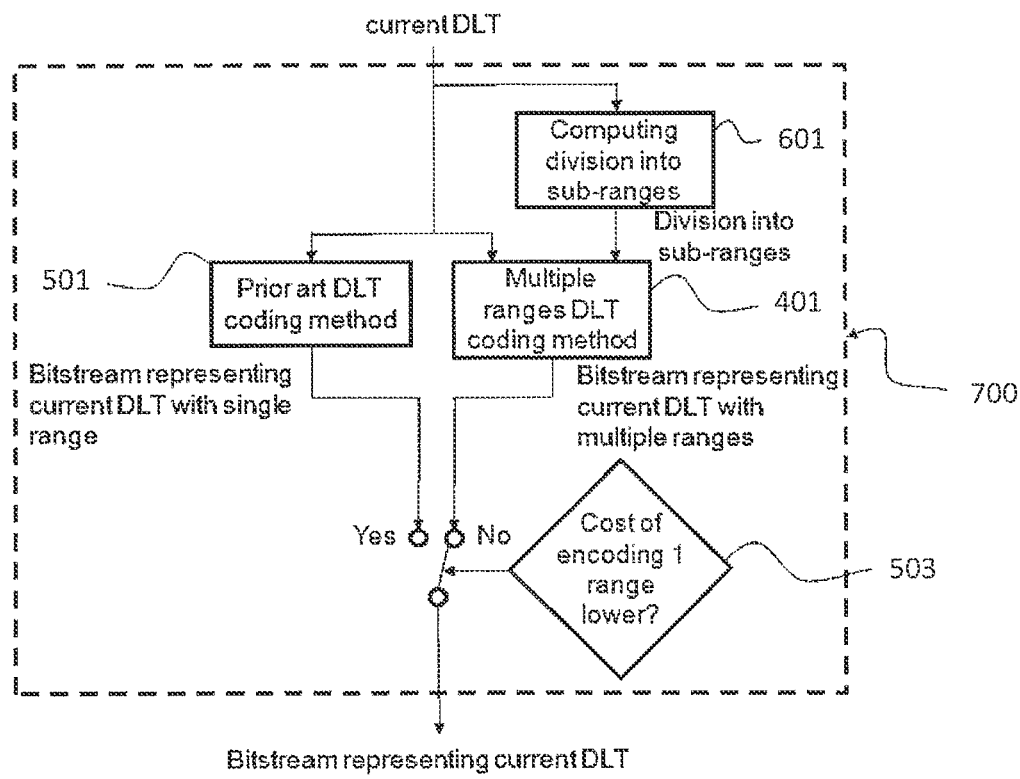
FIG. 7 shows a block diagram illustrating a method 700 for adaptive multi-range DLT coding by applying an adaptive number of sub-ranges according to an implementation form.

FIG. 7 shows a block diagram illustrating a method 700 for adaptive multi-range DLT coding by applying an adaptive number of sub-ranges according to an implementation form.

The method 700 comprises multi-range DLT coding using the adaptive multi-range DLT coding with adaptive number of sub-ranges method. In block 501, DLT coding method of the input signal is performed as in the prior art as described above with respect to FIG. 1. In Block 401, multi-range DLT coding method is performed. In Block 503, decision is made whether use single- or multi-range coding method based on the cost of encoding of each option. In Block 601, division of the original range of values into sub-ranges is computed based on the defined algorithm.

Figure 8:
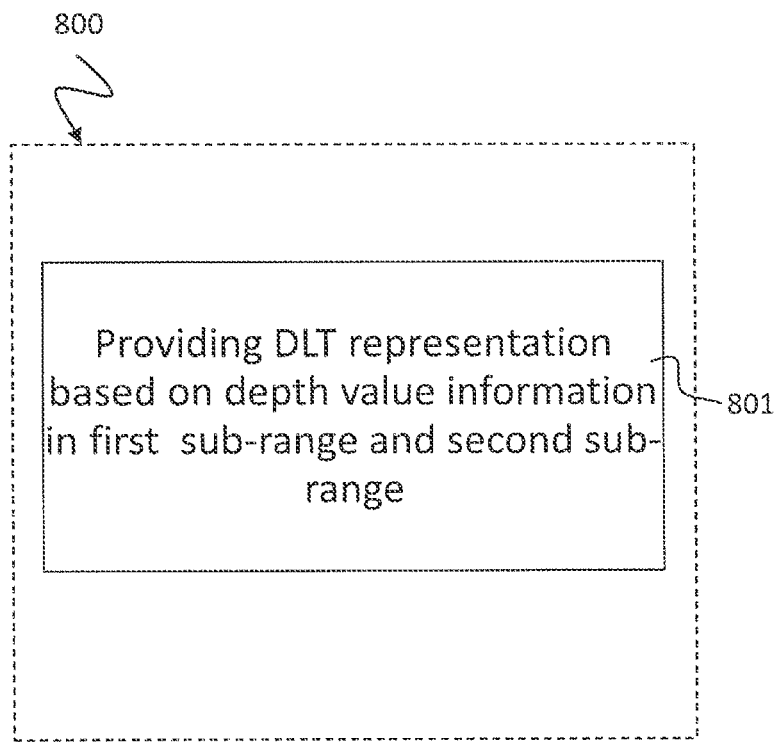
FIG. 8 shows a schematic diagram illustrating a method 800 for providing a representation of a depth lookup table (DLT) according to an implementation form.

FIG. 8 shows a schematic diagram illustrating a method 800 for providing a representation of a depth lookup table (DLT) according to an implementation form. The depth lookup table may be a DLT as described above with respect to FIG. 3. The depth lookup table 300 is associated to at least a part of a 3D picture. The method 800 comprises: providing 801 the representation of the depth lookup table 300 based on depth value information comprised in a first sub-range representation of the representation of the depth lookup table 300, which comprises depth value information associated to a first sub-range of a range of depth value information of the representation of the depth lookup table, and based on depth value information comprised in a second sub-range representation of the representation of the depth lookup table 300, which comprises depth value information associated to a second sub-range of the range of depth value information of the representation of the depth lookup table.

In an implementation form, the method 800 further comprises: receiving a bitstream comprising the first sub-range representation of the representation of the depth lookup table 300 and the second sub-range representation of the representation of the depth lookup table 300 separately multiplexed; and demultiplexing the bitstream to obtain the first sub-range representation of the representation of the depth lookup table 300 and the second sub-range representation of the representation of the depth lookup table 300.

In an implementation form, the method 800 further comprises: analyzing a multi-range indicator, for example comprised in a coding unit coding level, a slice header coding level, a picture header coding level, a picture parameter set coding level, a SPS coding level or a SEI coding level, the multi-range indicator indicating whether the representation of the depth lookup table is encoded as a plurality of separate sub-range representations; and providing, in case the multi-range indicator indicates that the representation of the depth lookup table is encoded as a plurality of sub-range representations, the representation of the depth lookup table 300 associated to at least the part of the 3D picture based on depth value information comprised in the plurality of sub-range representations of the representation of the depth lookup table 300, the plurality of sub-range representations of the representation of the depth lookup table 300 comprising at least the first sub-range representation and the second sub-range representation of the representation of the depth lookup table 300.

In an implementation form, the method 800 further comprises: analyzing a multi-range indicator, for example comprised in a coding unit coding level, a slice header coding level, a picture header coding level, a picture parameter set coding level, a SPS coding level or a SEI coding level, the type indicator indicating whether the representation of the depth lookup table is encoded as a plurality of sub-range representations and/or indicating the number of ranges or sub-ranges the representation of the depth lookup table is encoded as; and providing, in case the multi-range indicator indicates that the representation of the depth lookup table is encoded as multiple sub-range representations, the representation of the depth lookup table 300 associated to at least the part of the 3D picture representation based on depth value information comprised in the plurality of sub-range representations of the representation of the depth lookup table 300, the plurality of sub-range representations of the representation of the depth lookup table 300 comprising at least the first sub-range representation and the second sub-range representation of the representation of the depth lookup table 300.

In an implementation form, the representation of the depth lookup table is a binary string representation of the depth lookup table 300, wherein the depth value information comprises or corresponds to a string of binary values, wherein a position of a binary value of the string of binary values in the string of binary values is associated to a depth value of the corresponding depth lookup table and wherein a length of the string of binary values corresponds to a size of the range of depth value information; and wherein the first sub-range representation of the representation of the depth lookup table is a first sub-range of the binary string representation of the depth lookup table, and wherein the second sub-range representation of the representation of the depth lookup table is a second sub-range of the binary string representation of the depth lookup table.

In an implementation form, the first sub-range of binary values of the binary string representation of the depth lookup table and the second sub-range of binary values of the binary string representation of the depth lookup table are separated by at least one binary value of the binary string representation of the depth lookup table.

In an implementation form, the method 800 further comprises: adding, based on a predetermined reconstruction algorithm, to the binary string representation of the depth lookup table binary values not comprised in the first sub-range representation of the representation of the depth lookup table and not comprised in the second sub-range representation of the representation of the depth lookup table.

In an implementation form, a first binary value, e.g. "1", of a binary value of the string of binary values indicates the occurrence of the depth value in the corresponding lookup table and a second binary value, e.g. "0", of a binary value of the string of binary values indicates the non-occurrence of the depth value in the corresponding lookup table.

In an implementation form, the representation of the depth lookup table is a difference binary string representation of the depth lookup table, wherein a first binary value, e.g. "1", of a binary value of the string of binary values of the difference binary string representation indicates the occurrence of a depth value in the depth lookup table 300, which does not occur in a reference depth lookup table 300, or indicates the occurrence of a depth value occurring in the reference lookup table, which does not occur in the depth lookup table 300, wherein a length of the string of binary values corresponds to or is equal to a size of the range of depth value information, and wherein the first sub-range representation of the representation of the depth lookup table is a first sub-range of the difference binary string representation of the depth lookup table, and wherein the second sub-range representation of the representation of the depth lookup table is a second sub-range of the difference binary string representation of the depth lookup table.

In an implementation form, the method 800 further comprises: providing a binary string representation of the depth lookup table 300 associated to at least the part of the 3D picture by adding to the binary string representation of the depth lookup table 300 depth value information, which is present in the difference binary string representation of the depth lookup table and which is not present in a binary string representation of the reference depth lookup table; and by adding or copying to the binary string representation of the depth lookup table 300 depth value information of the binary string representation of the reference DLT, which is not present in the difference binary string representation of the depth lookup table.

In an implementation form, the method 800 further comprises: providing a binary string representation of the depth lookup table 300 associated to at least the part of the 3D picture by applying one of a logical XOR operation and a logical XNOR operation to the binary values of the difference binary string representation and the binary values of the reference binary string representation associated to the same depth values to obtain binary values of the binary string representation of the depth lookup table.

In an implementation form, the difference binary string representation of the depth lookup table corresponds to a range constrained bit map, RCBM, coded difference binary string, and the binary string representation of the reference depth lookup table corresponds to a range constrained bit map, RCBM, coded reference binary string.

In an implementation form, the reference depth lookup table is a depth lookup table associated to other 3D pictures associated to other views, to other 3D pictures associated to other views and/or time instances of a 3D video sequence comprising the 3D picture, or to other parts of the same 3D picture, for a corresponding part of another 3D picture associated to other views and/or time instances, wherein a part of the 3D picture comprises a slice, a coding unit, a coding block, or a macroblock of the 3D picture.

In an implementation form, the method 800 further comprises: analyzing a difference coding indicator, for example comprised in a coding unit coding level, a slice header coding level, a picture header coding level, a picture parameter set coding level, a SPS coding level or a SEI coding level, the difference coding indicator indicating a type of difference encoding and/or the reference depth lookup table used for obtaining the difference binary string representation of the depth lookup table; selecting a binary string representation of a reference depth lookup table according to the type indicator; and providing the representation of a depth lookup table 300 associated to at least the part of the 3D picture.

Figure 9:
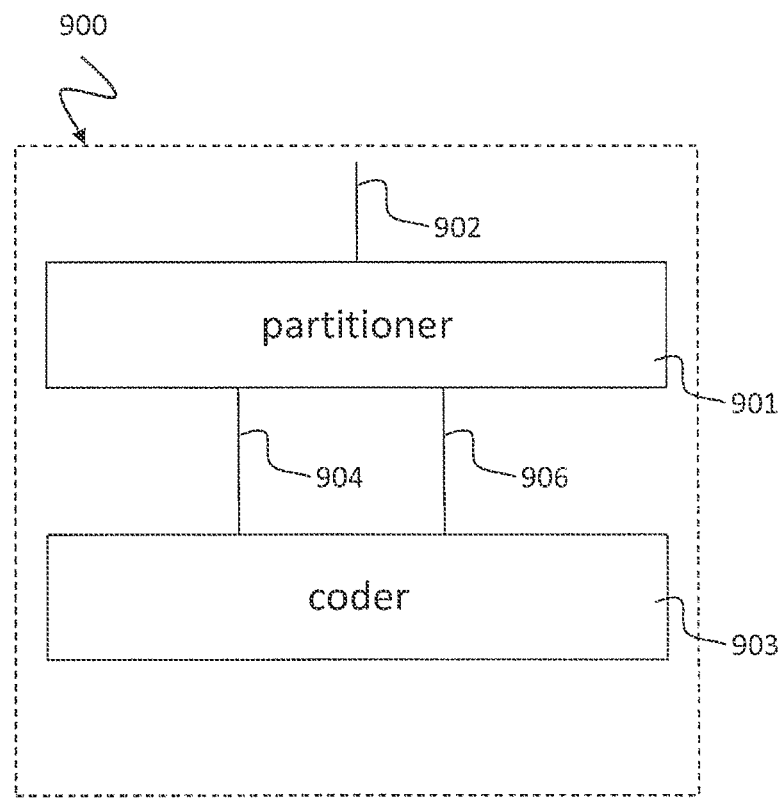
FIG. 9 shows a schematic diagram illustrating an apparatus 900 for sub-range based coding a depth lookup table (DLT) according to an implementation form.

FIG. 9 shows a schematic diagram illustrating an apparatus 900 for sub-range based coding a depth lookup table (DLT) according to an implementation form.

The depth lookup table comprises depth values of a 3D video sequence, the depth values being constrained within a range 902. The apparatus comprises: a partitioner 901 configured for partitioning the range 902 into a plurality of sub-ranges, a first sub-range 904 comprising a first set of the depth values and a second sub-range 906 comprising a second set of the depth values; and a coder 903 configured for coding the depth values of each of the sub-ranges of the depth lookup table 300 separately according to a predetermined coding rule.

Figure 10:
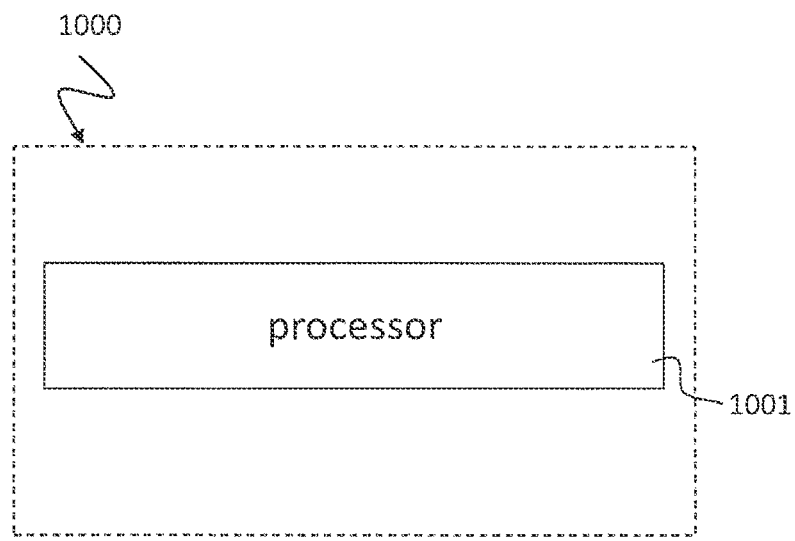
FIG. 10 shows a schematic diagram illustrating an apparatus 1000 for providing a representation of a depth lookup table (DLT) according to an implementation form.

FIG. 10 shows a schematic diagram illustrating an apparatus 1000 for providing a representation of a depth lookup table (DLT) according to an implementation form.

The apparatus 1000 comprises a processor 1001 for performing the method 200 as described above with respect to FIG. 2.

Figure 11:
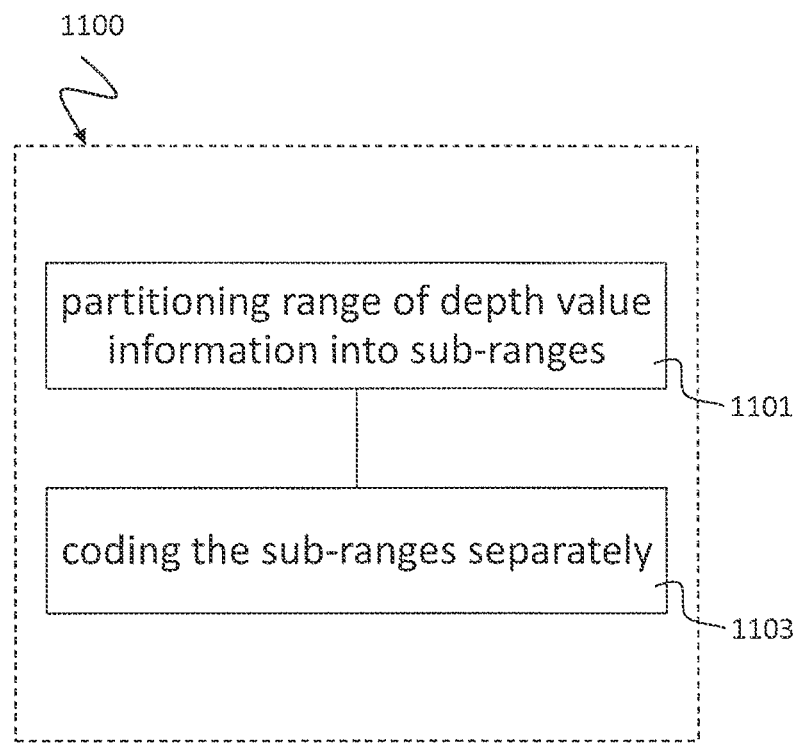
FIG. 11 shows a schematic diagram illustrating a method 1100 for coding a representation of a depth lookup table (DLT) according to an implementation form.

FIG. 11 shows a schematic diagram illustrating a method 1100 for coding a representation of a depth lookup table (DLT) according to an implementation form. The depth lookup table may be a DLT as described above with respect to FIG. 3.

The depth lookup table 300 is associated to at least a part of a 3D picture. The method 1100 comprises: partitioning 1101 a range of depth value information of the representation of the depth lookup table into a plurality of sub-ranges, wherein a first sub-range of the plurality of sub-ranges comprises a first set of depth value information, and a second sub-range of the plurality of sub-ranges comprises a second set of depth value information; and coding 1103, according to a predetermined coding rule, the first sub-range of depth value information and the second sub-range of depth value information separately.

Figure 12:
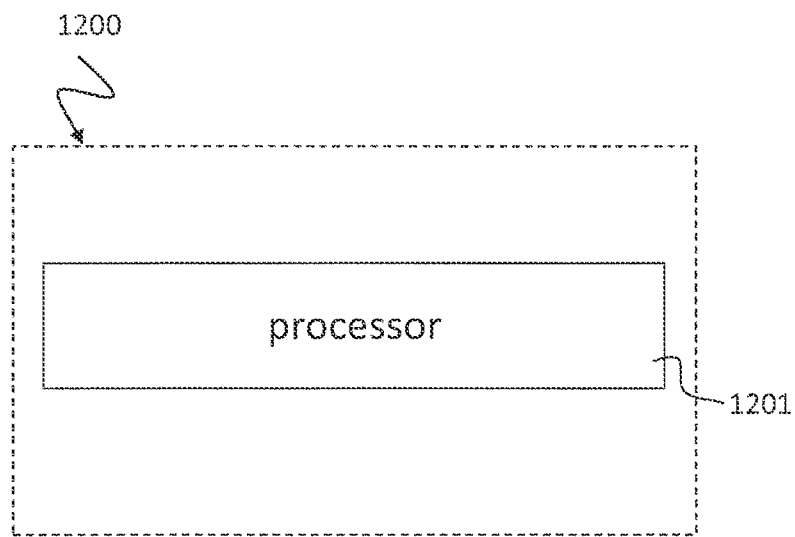
FIG. 12 shows a schematic diagram illustrating an apparatus 1200 for coding a representation of a depth lookup table (DLT) according to an implementation form.

FIG. 12 shows a schematic diagram illustrating an apparatus 1200 for coding a representation of a depth lookup table (DLT) according to an implementation form. The apparatus 1200 comprises a processor 1201 for performing the method 1100 as described above with respect to FIG. 11.

Figure 13A:
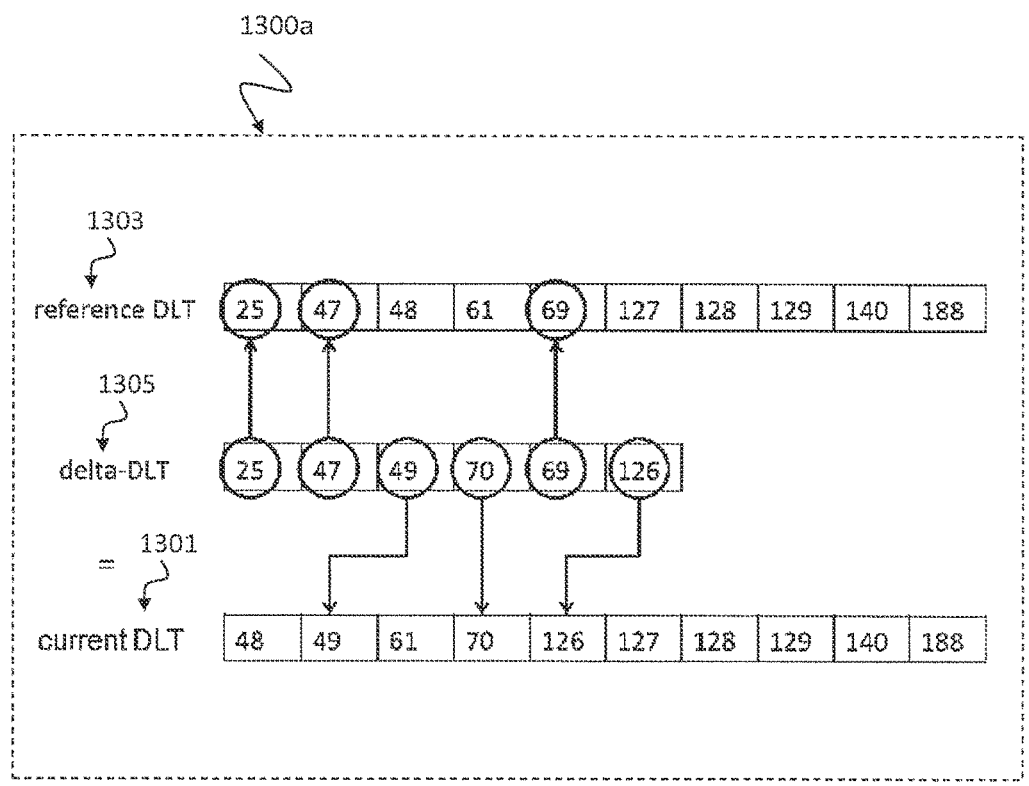
FIG. 13a shows a schematic diagram illustrating a method 1300a of computing the current DLT 1301 based on delta-DLT 1305 and reference DLT 1303 by comparing DLT values according to an implementation form.

FIG. 13a shows a schematic diagram illustrating a method 1300a of computing the current DLT 1301 based on delta-DLT 1305 and reference DLT 1303 by comparing DLT values according to an implementation form.

The current DLT 1301 is the DLT that is currently being encoded/decoded. The reference DLT 1303 is the DLT that is selected as the reference DLT lookup table, e.g. selected among already encoded/decoded DLT lookup tables, based on a defined ordering. The selection of the reference DLT 1303 depends on the prediction scenarios for the DLT coding/decoding that is used and availability of already encoded/decoded DLTs. If no reference DLT is available, the current DLT 1301 is encoded/decoded using the prior art.

According to FIG. 13a, instead of signaling the range of values in the current DLT 1301 that are to be encoded/decoded, only a difference between the current DLT 1301 and the reference DLT 1303 within a range is signaled. The difference, called delta-DLT 1305 consists of both, new values that are present in the current DLT 1301 but are not present in the reference DLT 1303, and values that are not present in the current DLT 1301 but are present in the reference DLT 1303. Consequently, based on the reference DLT 1303 and delta-DLT 1305, the current DLT 1301 can be decoded or computed using the following procedure (see FIG. 13a).

For each value in the delta-DLT 1305, it is checked whether the particular value is also present in the reference DLT 1303. If the value is present in the reference DLT 1303, that corresponding value is not added to the current DLT, i.e. that corresponding value is removed. If the value is not present in the reference DLT 1303, that corresponding value is added to the current DLT, i.e. the value is added. All other values of the reference DLT 1303 are copied or added to the current DLT.

Figure 13B:
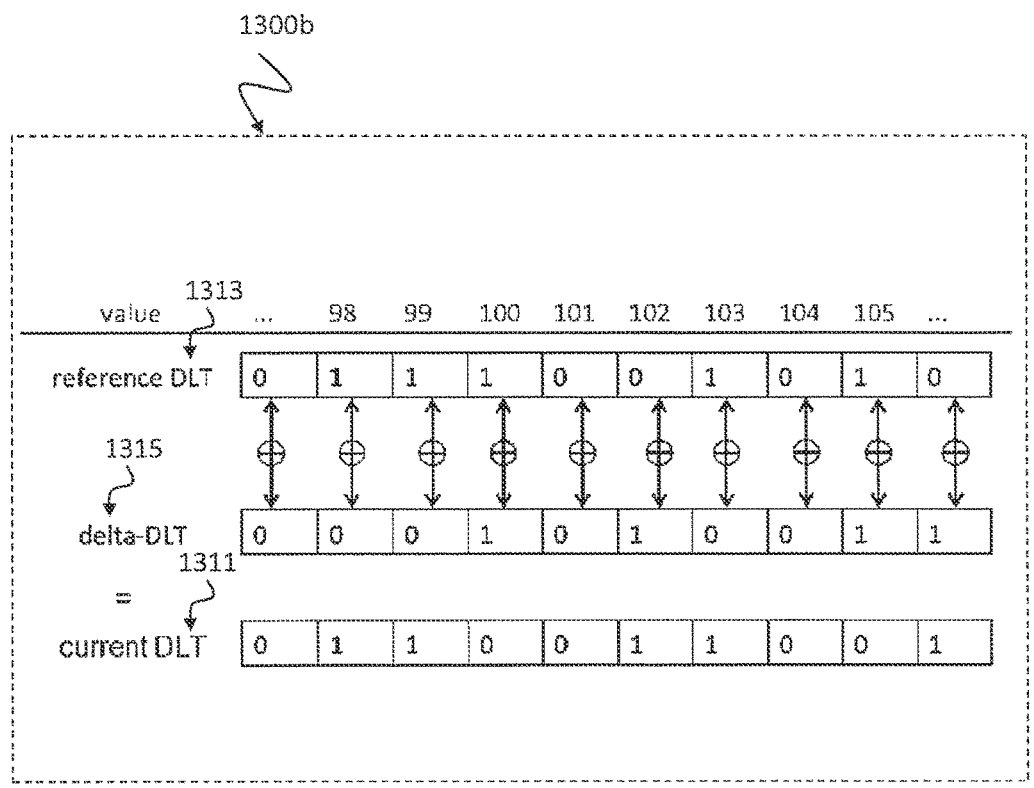
FIG. 13b shows a schematic diagram illustrating a method 1300b of computing the current DLT 1311 based on delta-DLT 1315 and reference DLT 1313 by comparing binary strings representing DLT values according to an implementation form.

FIG. 13b shows a schematic diagram illustrating a method 1300b of computing the current DLT 1311 based on delta-DLT 1315 and reference DLT 1313 by comparing binary strings representing DLT values according to an implementation form.

If the range of values in the DLT is represented as a binary string, e.g. in a range constrained bit map DLT coding method called RCBM as described in the prior art (cf. [Kai Zhang, Jicheng An, Shawmin Lei, "3D-CE6.h related: An efficient coding method for DLT in 3DVC", Document of Joint Collaborative Team on 3D Video Coding Extension Development, JCT3V-C0142, January, 2013]), the difference between current DLT 211 and reference DLT 213, i.e. the delta-DLT 1315, can be efficiently computed using the XOR (exclusive OR) logical operator. In such a case, a binary string representing the difference between the current 1311 and the reference DLTs 1313 is equal to the XOR operator applied to binary strings representing the concerned range of values in two DLTs. As a result, the binary string representing the difference DLT 1315 can be computed by applying the XOR operator to the binary strings representing the reference DLT 1313 and the current DLT 1311 (cf. FIG. 13b). In an alternative realization, an XNOR operator is used in the process of computing the binary string representing the delta-DLT 1315.

On the other hand, at the decoding side, the original current DLT 21311 can be efficiently obtained or computed based on the reference DLT 1313 and the delta-DLT 1315 by applying the XOR (exclusive OR) logical operator. In such a case, the binary string representing the current DLT 1311 is equal to the XOR operator applied to the binary strings representing the reference DLT 1313 and delta DLT 1315 in the concerned range of values. As a result, the binary string representing the current DLT 1311 can be computed by applying the XOR operator to the binary strings representing the reference DLT 1313 and the delta-DLT 1315 (cf. FIG. 13b). In an alternative realization, an XNOR operator is used in the process of computing the binary string representing the delta-DLT 1315 and the reference DLT 1311 to obtain the reference DLT 213.

The more similar the current DLT and reference DLT are, e.g. the more depth values or corresponding depth value information they have in common, the smaller the number of depth values in the corresponding delta DLT. Referring to the binary string representation as shown in FIG. 13b, the more similar the current DLT 1311 and the reference DLT 1313 are, the smaller the number of first values ("1" with reference to FIG. 1) in the binary string of the delta-DLT 1315, which may also be referred to as difference bit string, i.e. the smaller the amount of information needed for representing the difference encoded current DLT. Referring to the range constrained bit map (RCBM) coding as described based on FIG. 1, similarities of the current DLT 1311 and the reference DLT 1313 often result in Delta-DLT 215 which show or comprise a reduced range, in FIG. 1 referred to as diff_max_dlt_value, compared to the current DLT encoded directly using RCBM. This leads to a further reduction of bit values to be transmitted or stored for representing the current DLT using the difference coding, or difference RCBM coding, compared to the conventional RCBM coding of the current DLT. Furthermore, such difference DLTs or delta-DLTs 1315 are typically very sparse and show larger gaps between smaller sub-ranges of first binary values, e.g. "1". Thus, these difference DLT are typically well suited for multi-range coding as described above, which makes use of this characteristic of such difference DLTs and allows for further coding gain.

At the same time the sub-ranges of the difference bit string delta-DLT 1315 can be encoded separately using the same algorithms and syntax as used for conventional RCBM, as described based on FIG. 3, which provides for less complex encoders and decoders.

If the delta-DLT 1315 indicates there is no difference between the current 1311 and the reference DLT 1313, e.g. the delta-DLT only comprises second binary values "0", in an implementation form, a single flag is used to signal such delta-DLT 1315. With this method, if the flag is set, delta-DLT 1315 indicates that reference 1313 and current DLTs 1311 are identical and no other information is required to be signaled in the delta-DLT 1315, otherwise, the delta-DLT 1315 consists of all information that is required to calculate the current DLT 1311 based on the reference DLT 1313.

The selection of the reference DLT 1313 depends on the prediction scenario that is used and, also, the availability of already encoded/decoded DLTs. First encoded/decoded DLT in the random access unit, e.g. sequence signaled e.g. in SPS, or intra-period signaled e.g. in SH of an I-slice cannot utilize the DLT prediction method described here, as no reference DLT 1313 is yet available. For encoding/decoding of all other DLTs, the prediction method is applied. If no reference DLT 1313 is available, the current DLT 1311 is encoded/decoded explicitly according to the prior art, i.e. as described in [Kai Zhang, Jicheng An, Shawmin Lei, "3D-CE6.h related: An efficient coding method for DLT in 3DVC", Document of Joint Collaborative Team on 3D Video Coding Extension Development, JCT3V-O0142, January, 2013]. Otherwise, the reference DLT 1313 is selected from other already encoded/decoded DLTs to exploit the similarity between the current 1311 and the reference DLT 1313. In case of single-view video sequence, the reference DLT 1313 is in an implementation form selected among DLTs that were encoded/decoded for other time instances, e.g. intra-periods, pictures, slices, etc. In case of a multi-view video sequence, the reference DLT 1313 is selected in an implementation form among DLTs that were encoded/decoded in other views of the multi-view video sequence. Consequently, temporal and/or spatial, i.e. inter-view prediction types can be utilized.

In a realization form, the method 1300a, 1300b comprises a method for coding a depth lookup table, the depth lookup table comprising depth value information of at least a part of a 3D picture, the method comprising: selecting a reference depth lookup table; determining a difference depth lookup table based on a comparison between depth value information of the depth lookup table to be coded and depth value information of the reference depth lookup table; and coding depth value information of the difference depth lookup table according to a predetermined coding rule.

This kind of coding may be also referred to as difference coding or differential coding.

In a realization form, "Differential coding" covers both, DLT prediction (e.g. time and view) and updating DLT (e.g. for single view/base view).

In a realization form, depth value information can be indices representing depth values (either as binary string or as sequence of integer index values) or depth values as such. Both options or representations can be called DLT. The DLT is used for encoding and decoding the depth maps.

The term "3D picture" is to be understood as texture information (e.g. RGB, etc) and depth information for a single view. The additional depth information is the difference to a corresponding 2D picture, comprising only the texture information.

A realization form covers DLTs for 3D video (3D picture sequences), single 3D pictures and for "parts" of a 3D picture or 3D picture sequence (e.g. slices, coding units, macro-blocks), and in a specific or extreme case one DLT specific for one time instant, one view and one "part"). In realization forms the DLT can be encoded together with texture information or separately. In further realization forms only the DLT is encoded.

In a realization form, the selecting the reference depth lookup table (reference DLT) is based on a selection criterion.

In a realization form, the selection criterion is predetermined, that is fixed. In a realization form, the selection criterion is adoptable.

In a realization form, the determining the difference depth lookup table (delta-DLT) is based on a comparison between depth value information of the depth lookup table to be coded (current DLT) and depth value information comprised in the reference depth lookup table (reference DLT).

In a realization form, the predetermined coding rule is the same as used for coding the reference DLT, i.e. "normal coding of full DLT", e.g. range constrained bit map coding for coding the reference DLT and for coding the difference DLT.

The new presented method of Depth Lookup Table coding/decoding provides high flexibility for the encoder/decoder while reducing the required bitrate for the DLT at the same time. As depth map characteristics may vary significantly between different sequences and even within the same sequence (between frames and between views), high flexibility for coding/decoding the DLT is provided by realizations of this method.

In order to utilize the similarity between DLT lookup tables representing values for different time instances (in case of video sequence) or time instances and views (in case of a multi-view sequence), the new method for DLT coding/decoding presented herewith uses DLT prediction of DLT values to decrease the amount of information that needs to be encoded/decoded to represent the DLT lookup table.

In a realization form, the difference depth lookup table comprises depth value information occurring in the depth lookup table to be coded and not occurring in the reference depth lookup table and comprises depth value information occurring in the reference depth lookup table and not occurring in the depth lookup table to be coded.

When the difference depth lookup table comprises such depth value information, the coding of the depth lookup table can be achieved very efficiently, and the difference encoded DLT requires less bits or bandwidth compared to the conventionally encoded DLT.

In a realization form, comparison is based on comparing depth values as such or integer indices. In a realization form, comparison is based on comparing existence (1) of depth value indices, i.e. a binary string.

In a realization form, the occurrence of depth values in the depth lookup table to be coded and the occurrence of depth values in the reference depth lookup table is represented as binary strings, wherein a first binary value, e.g. "1", of the binary strings indicates the occurrence of a depth value, in particular the occurrence an individual depth value, in the corresponding depth lookup table, and a second binary value, e.g. "0", of the binary strings indicates the non-occurrence of a depth value, in particular the non-occurrence an individual depth value, in the corresponding depth lookup table.

By using such binary strings, the coding is reduced to indicating a presence or non-presence, or occurrence and non-occurrence, of a depth value in the DLT which allows a very efficient coding.

In a realization form, the first binary value of the binary string is a binary "1" and the second binary value of the binary string is a binary "0". In other realization forms, the first binary value of the binary string is a binary "0" and the second binary value of the binary string is a binary "1".

In a realization form, the occurrence of individual depth values in the depth lookup table to be coded and the occurrence of individual depth values in the reference depth lookup table is represented as binary strings, wherein a first binary value ("1") of the binary strings indicates the occurrence of an individual depth value in the corresponding depth lookup table.

In a realization form, the determining the difference depth lookup table comprises: applying one of a logical XOR operation and a logical XNOR operation to the binary strings representing the depth value information of the depth lookup table to be coded and the depth value information of the reference depth lookup table.

Logical XOR gates or XNOR gates are standard circuits which are easy to implement.

In a realization form, the method further comprises: coding depth value information of the reference lookup table using a range constrained bit map coding of the reference depth lookup table; wherein the coding the depth value information of the difference depth lookup table is also performed using a range constrained bit map coding of the difference depth lookup table.

Using a range constrained bit map coding of the difference depth lookup table is an efficient coding as the range of coding values is constrained, in other words the length of the binary string is reduced, thereby providing a reduced amount of information.

In a realization form, the method comprises: using a flag for indicating an identity between the depth lookup table to be coded and the reference depth lookup table.

In a realization form, the coding the difference depth lookup table according to a predetermined coding rule is reduced to providing that flag if the flag indicates identity between the depth lookup table to be coded and the reference depth lookup table.

By using this flag, the whole depth lookup table can be coded, in case of identity between depth lookup table and reference lookup table, by a single bit which is a very efficient representation of information.

In a realization form, the reference depth lookup table is selected among, for example previously coded, depth lookup tables for other 3D pictures associated to other views, for other 3D pictures associated to other views and/or time instances of a 3D video sequence comprising the 3D picture, or for other parts of the same 3D picture, for a corresponding part of another 3D picture associated to other views and/or time instances, wherein a part of the 3D picture comprises a slice, a coding unit, a coding block, or a macro block of the 3D picture.

When selecting the reference depth lookup table among, for example previously coded, depth lookup tables, the reference depth lookup table can easily be provided.

In a realization form, in case of a single-view video sequence the reference depth lookup table is selected among, for example previously coded, depth lookup tables for other time instances, in particular among, for example previously coded, depth lookup tables for one of intra-periods, pictures and slices of a 3D video sequence comprising the 3D picture.

When the reference depth lookup table is selected among, for example previously coded, depth lookup tables for other time instances, a lot of DLTs is available for selection.

In a realization form, in case of a multi-view video sequence the reference depth lookup table is selected among previously coded depth lookup tables for other views and/or time instances of the multi-view video sequence, in particular among previously coded depth lookup tables for one of intra-periods, pictures and slices of a 3D video sequence comprising the 3D picture.

When the reference depth lookup table is selected among previously coded depth lookup tables for other views and/or time instances, the best DLT, e.g. in terms of coding gain, for starting prediction can be selected.

In a realization form, the reference depth lookup table is selected among previously coded depth lookup tables of a same coding level, in particular of a slice header coding level, a coding unit coding level, a SPS coding level, a PPS coding level or a SEI coding level.

When the reference depth lookup table is selected among, for example previously coded, depth lookup tables of a same coding level, the reference DLT can easily be found.

In a realization form, the reference depth lookup table is selected among previously coded depth lookup tables of a higher coding level, in particular of a slice header coding level, a picture header coding level, a picture parameter set coding level, a SPS coding level, a SEI coding level, an SPS coding level, a picture header coding level, a slice header coding level or a SEI coding level.

When the reference depth lookup table is selected among, for example previously coded, depth lookup tables of a higher coding level, a single reference DLT can be used for multiple DLTs to be predicted.

Coding level and ranking of levels is defined starting from a lowest "macroblock level" to a highest "SPS level."

In a realization form, the method further comprises: protecting the difference depth lookup table against corruptions of the reference depth lookup table, in particular by signaling a bit length of the depth values of the reference depth lookup table in a higher coding level, in particular in a slice header coding level, a picture header coding level, a picture parameter set coding level, a SPS coding level, a SEI coding level, a picture header coding level or a slice header coding level; or by sending a lost reference depth lookup table (reference DLT) in a dedicated supplemental enhancement information, SEI, message.

When signaling a bit length of the depth values of the reference depth lookup table in a higher coding level, the difference DLT can be efficiently protected against corruptions.

In a realization form, the coding the difference depth lookup table comprises a range constrained bit map coding according to 3D Video Coding Extension Development of ITU-T and ISO/IEC standardization.

When the coding the difference depth lookup table comprises a range constrained bit map coding according to 3D Video Coding Extension Development of ITU-T and ISO/IEC standardization, the method is compliant to the standards.

In a realization form, the method further comprises: coding depth value information of the reference lookup table using the same coding algorithm as used for coding the depth value information of the difference depth lookup table.

Coding depth value information of the reference lookup table using the same coding algorithm is highly efficient, as only one coding algorithm has to be implemented.

In a realization form, the method 1300a, 1300b is implemented in an apparatus for coding a depth lookup table, the depth lookup table comprising depth value information of at least a part of a 3D picture, the apparatus comprising a processor configured to implement the method 1300a, 1300b.

This kind of coding may be also referred to as difference coding or differential coding.

In a realization form, "Differential coding" covers both, DLT prediction (e.g. time and view) and updating DLT (e.g. for single view/base view).

In a realization form, depth value information can be indices representing depth values (either as binary string or as sequence of integer index values) or depth values as such. Both options are called DLT, DLT is used for encoding and decoding the depth maps.

The term "3D picture" is to be understood as texture information (e.g. RGB, etc) and depth information for a single view. The additional depth information is the difference to a 2D picture.

A realization form covers DLTs for 3D video (3D picture sequences), single 3D pictures and for "parts" of a 3D picture or 3D picture sequence (e.g. slices, coding units, macro-blocks or in an extreme case one DLT specific for one time instant, one view and one "part").

In a realization form, the selecting the reference depth lookup table (reference DLT) is based on a selection criterion.

In a realization form, the selection criterion is predetermined, that is fixed. In a realization form, the selection criterion is adoptable.

In a realization form, the determining the difference depth lookup table (delta-DLT) is based on a comparison between depth value information of the depth lookup table to be coded (current DLT) and depth value information comprised in the reference depth lookup table (reference DLT).

In a realization form, the predetermined coding rule is the same as used for coding the reference DLT, i.e. "normal coding of full DLT."

The new presented apparatus for Depth Lookup Table coding/decoding provides high flexibility for the encoder/decoder while reducing the required bitrate for the DLT at the same time. As depth map characteristics may vary significantly between different sequences and even within the same sequence (between frames and between views), high flexibility for coding/decoding the DLT is provided by this apparatus.

In order to utilize the similarity between DLT lookup tables representing values for different time instances (in case of video sequence) or time instances and views (in case of a multi-view sequence), the apparatus for DLT coding/decoding presented herewith uses DLT prediction of DLT values to decrease the amount of information that needs to be encoded/decoded to represent the DLT lookup table.

In a realization form, the method 1300a, 1300b comprises a method for decoding a depth lookup table associated to at least a part of a 3D picture, the method comprising: decoding the depth lookup table associated to at least the part of the 3D picture by adding to the representation of the depth lookup table depth value information, which is present in the same kind of representation of a difference depth lookup table associated to at least the part of a 3D picture and which is not present in a representation of a reference depth lookup table; copying to the depth lookup table depth value information of the representation of the reference DLT, which is not present in the representation of the difference depth lookup table.

In a realization form, the method for decoding the depth lookup table is a method for providing a representation of a depth lookup table.

The new presented method for decoding Depth Lookup Tables provides high flexibility for the decoding while reducing the required bitrate for the DLT at the same time. As depth map characteristics may vary significantly between different sequences and even within the same sequence (between frames and between views), high flexibility for decoding the DLT is provided.

In a realization form, the representation of the difference depth lookup table corresponds to the difference lookup table and the representation of the reference lookup table corresponds to the reference lookup table, and the depth value information corresponds to the depth values.

Thus, the method provides a high degree of flexibility as any difference lookup table, reference lookup table and depth values can be used for this method.

The term "corresponds" can have the meaning of "is" or the meaning of "is formed by."

In a realization form, the method further comprises: decoding an encoded representation of the difference depth lookup table to obtain the difference lookup table; and decoding an encoded representation of the reference depth lookup table to obtain the reference lookup table.

Such a decoding is highly efficient kind of decoding as encoded representations are used.

In a realization form, the representation of the difference depth lookup table corresponds to a difference list of indices representing depth values of the corresponding difference lookup table, the representation of the reference depth lookup table corresponds to a reference list of indices representing depth values of the corresponding reference lookup table, and wherein the depth value information corresponds to the indices, i.e. the depth value indices.

Applying indices and lists of indices offers high flexibility at low computational complexity.

In a realization form, the representation of the difference depth lookup table corresponds to a difference binary string comprising a string of binary values, wherein a position of a binary value is associated to a depth value and a first binary value "1" of a binary value indicates the occurrence of the depth value in the corresponding difference lookup table, the representation of the reference depth lookup table corresponds to a reference binary string comprising a string of binary values, wherein a position of a binary value is associated to a depth value and the first binary value "1" of a binary value indicates the occurrence of the depth value in the corresponding reference lookup table, and wherein the depth value information corresponds to the binary strings. Such binary values can be efficiently processed.

In a realization form, the representation of the difference depth lookup table corresponds to a range constrained bit map, RCBM, coded difference binary string, and the representation of the reference depth lookup table corresponds to a range constrained bit map, RCBM, coded reference binary string.

A range constrained bitmap is a very efficient way of representing information as the range of values is constrained thereby reducing the amount of information to be processed.

In a realization form, the method further comprises: analyzing a flag for indicating an identity between the representation of the depth lookup table and the representation of the reference depth lookup table; in case the flag indicates an identity, using the representation of the reference depth lookup table as representation of the depth lookup table associated to at least the part of a 3D picture.

Using a flag allows reduction of a depth lookup table to a single bit which is a very efficient way of decoding.

In a realization form, analyzing a flag specifies parsing for a flag in a bitstream, the bitstream comprising data associated to the representation of the depth lookup table.

In a realization form, the reference depth lookup table is selected among previously coded depth lookup tables for other 3D pictures associated to other views, for other 3D pictures associated to other views and/or time instances of a 3D video sequence comprising the 3D picture, or for other parts of the (same) 3D picture, for a corresponding part of another 3D picture associated to other views and/or time instances, wherein a part of the 3D picture comprises a slice, a coding unit, a coding block, or a macro block of the 3D picture.

When the reference depth lookup table is selected among previously coded depth lookup tables for other 3D pictures associated to other views, a broad data base is available for selecting the optimum DLT.

In a realization form, the method further comprises: analyzing a type indicator comprised in a coding unit coding level, a slice header coding level, a picture header coding level, a picture parameter set coding level, a SPS coding level or a SEI coding level, the type indicator indicating whether the representation of the depth lookup table is encoded; and decoding the depth lookup table associated to at least the part of the 3D picture according to the first aspect as such or according to any of the preceding implementation forms of the first aspect in case the type indicator indicates that representation of the depth lookup table is encoded.

By using the type indicator, a decision whether to decode the DLT can be efficiently provided.

In a realization form, the decoding of the depth lookup table specifies a providing a representation of a depth lookup table.

In a realization form, analyzing a type indicator specifies parsing for a type indicator (flag, single or more bits) in a bitstream, the bitstream comprising data associated to the representation of the depth lookup table.

In a realization form, the type indicator indicates whether the representation of the depth lookup table is differential encoded.

In a realization form, the method further comprises: analyzing a type indicator comprised in a coding unit coding level, a slice header coding level, a picture header coding level, a picture parameter set coding level, a SPS coding level or a SEI coding level, the type indicator indicating a type of encoding used for encoding the representation of the depth lookup table; selecting a decoding of a reference depth lookup table according to the type indicator; and providing the decoding of a depth lookup table associated to at least the part of the 3D according to the first aspect as such or according to any of the preceding implementation forms of the first aspect.

When analyzing the type of encoding used for encoding the representation of the depth lookup table, the corresponding decoding can be chosen based on that type information. The correct decoding can thus be selected.

In a realization form, the type indicator indicates a type of differential encoding used for differential encoding the representation of the depth lookup table.

In a realization form, analyzing a type indicator specifies parsing for a type indicator (flag, single or more bits) in a bitstream, the bitstream comprising data associated to the representation of the depth lookup table.

In a realization form, the type indicator determines DLT representation. In a realization form, the type indicator determines which DLT is used as the reference DLT.

In a realization form, the selecting a representation of a reference depth lookup table specifies a decoding the reference depth lookup table.

In a realization form, the providing the representation of a depth lookup table specifies a providing the decoded depth lookup table.

In a realization form, in case of a single-view video sequence the representation of the reference depth lookup table corresponds to a depth lookup table associated to another time instance, in particular to a depth lookup table for one of intra-periods, pictures and slices of a 3D video sequence comprising the 3D picture.

Such reference DLT allows flexible decoding. The decoding can be applied for single-view and multi-view video sequences.

In a realization form, in case of a multi-view video sequence the representation of the reference depth lookup table corresponds to a depth lookup tables associated for other views and/or time instances of the multi-view video sequence, in particular to depth lookup tables for one of intra-periods, pictures and slices of a 3D video sequence comprising the 3D picture.

Such reference DLT allows flexible decoding. The decoding can be applied for single-view and multi-view video sequences.

In a realization form, the representation of the reference depth lookup table corresponds to a depth lookup table of a same coding level, in particular of a slice header coding level, a coding unit coding level, a SPS coding level, a PPS coding level or a SEI coding level.

When the representation of the reference depth lookup table corresponds to a depth lookup table of a same coding level, the decoding can be efficiently performed.

In a realization form, the representation of the reference depth lookup table corresponds to a depth lookup table of a same slice header coding level, a same coding unit coding level, a same SPS coding level, a same PPS coding level or a same SEI coding level.

When the representation of the reference depth lookup table corresponds to a depth lookup table of a same coding level, the decoding can be efficiently performed.

In a realization form, the representation of the reference depth lookup table corresponds to a depth lookup table of a higher coding level, in particular of a slice header coding level, a picture parameter set coding level, a SPS coding level or a SEI coding level.

When the representation of the reference depth lookup table corresponds to a depth lookup table of a higher coding level, the decoding can be efficiently performed as a single reference DLT can be used for decoding multiple DLTs.

In a realization form, the difference depth lookup table comprises depth value information occurring in the depth lookup table to be coded and not occurring in the reference depth lookup table and comprises depth value information occurring in the reference lookup table and not occurring in the depth lookup table to be coded.

When the difference depth lookup table comprises depth value information occurring in the depth lookup table to be coded and not occurring in the reference depth lookup table and comprises depth value information occurring in the reference lookup table and not occurring in the depth lookup table to be coded, the decoding can be performed in an efficient way as redundant information is removed.

In a realization form, the method 1300a, 1300b is implemented on an apparatus for providing a depth lookup table associated to at least a part of a 3D picture, the apparatus comprising a processor configured: for adding to the representation of the depth lookup table depth value information, which is present in a same kind of representation of a difference depth lookup table associated to at least the part of a 3D picture and which is not present in a representation of a reference depth lookup table; copying to the depth lookup table depth value information of the representation of the reference DLT, which is not present in the representation of the difference depth lookup table.

Such apparatus for providing a DLT provides high flexibility for the encoding/decoding while reducing the required bitrate for the DLT at the same time. As depth map characteristics may vary significantly between different sequences and even within the same sequence (between frames and between views), high flexibility for encoding/decoding the DLT is provided.

In a realization form, the method 1300a, 1300b is implemented on an apparatus for providing a depth lookup table associated to at least a part of a 3D picture, the apparatus comprising a processor configured to implement the method 1300a, 1300b.

Such apparatus for providing a DLT provides high flexibility for the encoding/decoding while reducing the required bitrate for the DLT at the same time.

In a realization form, the method 1300a, 1300b comprises a method for encoding DLT lookup tables in a 3D video sequence, the method comprising: determining which DLT undergoes a prediction process based on pre-defined criteria and which is not predicted; computing a difference between said predicted DLT and a correspondent reference DLT obtaining a delta-DLT; and encoding an input signal as in the prior art.

Such method for providing DLTs provides high flexibility for the encoding while reducing the required bitrate for the DLT at the same time.

In a realization form, the method 1300a, 1300b comprises a method for decoding a DLT table, wherein the decoding is corresponding to the coding of the sixth aspect.

When the decoding is corresponding to the coding, the method can be easily implemented, because only one hardware or software function is required.

In a realization form, the reference and delta-DLT can be adaptively selected depending on the context (e.g. if the input signal is delta-DLT or reference DLT).

Such adaptive selection provides a high degree of flexibility.

In a realization form, the method comprises signaling zero delta-DLT using a single flag.

Signaling by using a single flag is highly computationally efficient as only one flag is required.

In a realization form, the method comprises computing current DLT from reference DLT and delta-DLT.

Computing current DLT from reference DLT and delta-DLT is flexible because it can be implemented syntax independently.

In a realization form, the method comprises computing current DLT from reference DLT and delta-DLT for binary representation of DLT using XOR or XNOR logical operator.

XOR or XNOR logical operators are standard gate functions that can be efficiently implemented in hardware or in software.

In a realization form, the method comprises DLT prediction scenarios.

Using DLT prediction scenarios allows a high degree of flexibility.

In a realization form, the method comprises hierarchical DLT signaling.

Hierarchical DLT signaling is easy to implement.

In a realization form, the method comprises minimizing the influence of possible transmission errors by signaling the bit length of DLT values in the higher coding level than the one used to signal DLTs (e.g. PPS).

Signaling the bit length of DLT values in the higher coding level allows reducing the influence of transmission errors.

In a realization form, the method comprises recovering reference DLT using SEI message.

By using SEI message, reference DLT can easily be recovered.

In a realization form, the method 1300a, 1300b comprises a method utilizing a DLT prediction mechanism whenever DLT is used as a coding tool.

In a realization form, the method comprises making a usage of DLT prediction switchable per sequence, per view, per picture, per slice and/or per coding unit.

Therefore, DLT prediction is flexible to be switched per sequence, per view, per picture, per slice and/or per coding unit.

In a realization form, the method comprises signaling in SPS, PPS, Picture Header, SH, or Coding Unit syntax.

The signaling thus can be performed in different syntax entities. Therefore, the method can be flexibly applied in such syntax entities.

In a realization form, the method comprises signaling the bit depth of DLT values per sequence, in particular per SPS, per picture, in particular per PPS and per slice.

Thus, the bit depth of DLT values can be flexibly signaled.

In a realization form, the method comprises signaling the prediction functionality per picture and/or per slice.

Thus, the prediction functionality can be flexibly signaled.

The fact of using the DLT prediction and/or type of selected DLT prediction type can be signaled in SPS, PPS, Picture Header, SH or CU using a dedicated syntax modification of these syntax elements. Also, the invention proposes a dedicated SEI message which consists of typical SEI message header with a SEI message type indicating that the SEI message consists of DLT prediction setup, a flag indicating if the DLT prediction is used and/or a value specifying the DLT prediction type to be used.

Further embodiments, which are based on a combination of difference and multi-range coding of depth lookup tables comprise a combined indicator indicating whether difference and/or multi-range coding or decoding is to be applied, and may further indicate further details about which type, etc of difference and/or multi-range coding or decoding is to be applied as described based on the above embodiments of the invention.

From the foregoing, it will be apparent to those skilled in the art that a variety of methods, systems, computer programs on recording media, and the like, are provided.

The present disclosure also supports a computer program product including computer executable code or computer executable instructions that, when executed, causes at least one computer to execute the performing and computing steps described herein.

Many alternatives, modifications, and variations will be apparent to those skilled in the art in light of the above teachings. Of course, those skilled in the art readily recognize that there are numerous applications of the invention beyond those described herein. While the present inventions has been described with reference to one or more particular embodiments, those skilled in the art recognize that many changes may be made thereto without departing from the scope of the present invention. It is therefore to be understood that within the scope of the appended claims and their equivalents, the inventions may be practiced otherwise than as specifically described herein.

What is claimed is:

1. A method for coding a depth lookup table, the depth lookup table comprising depth values of at least a part of a 3D video sequence, the depth values being constrained within a range, the method comprising:
   partitioning the range into a plurality of sub-ranges, a first sub-range comprising a first set of the depth values and a second sub-range comprising a second set of the depth values; and
   coding the depth values of each of the first and second sub-ranges to the depth lookup table according to a predetermined coding rule;
   wherein for a depth lookup table belonging to a predetermined group of depth lookup tables,
      the range is partitioned into a fixed number of sub-ranges if a coding type indicates non-adaptive coding; and
      the range is partitioned into a selectable number of sub-ranges if the coding type indicates adaptive coding.

2. The method of claim 1, comprising:
   signaling a position of the second sub-range in the range of the depth values of the depth lookup table by using an offset to the position of the first sub-range.

3. The method of claim 2, comprising:
   signaling a width of a sub-range by using a parameter indicating the width of that sub-range.

4. The method of claim 1, wherein an occurrence of the depth values in each of the first and second sub-ranges of the depth lookup table is signaled as binary string.

5. The method of claim 1, wherein the depth values of each of the first and second sub-ranges of the depth lookup table are coded by using a range constrained bit map coding according to 3D Video Coding Extension Development of ITU-T and ISO/IEC standardization.

6. The method of claim 1, wherein the partitioning the range into a plurality of sub-ranges is based on a selection criterion.

7. The method of claim 6, comprising:
   signaling a result of the selection by using a flag.

8. The method of claim 1, comprising:
   selecting the coding type with respect to the predetermined group of depth lookup tables.

9. The method of claim 1, wherein a number of the sub-ranges is selected based on an optimization criterion with respect to a cost of coding the depth values of each of the sub-ranges.

10. The method of claim 9, wherein the selecting based on the optimization criterion comprises:
    setting the initial range as sub-range;
    partitioning the sub-ranges into new sub-ranges with respect to largest gaps between depth values of the depth lookup table; and
    if
       a cost of signaling the sub-ranges is greater than a cost of signaling the new sub-ranges and a number of the sub-ranges is below a predetermined number, proceed with the partitioning the sub-ranges, wherein the new sub-ranges are applied as the sub-ranges in the partitioning,
    else
       finish with providing the non-partitioned sub-ranges.

11. The method claim 1, wherein a number of sub-ranges and/or the coding type is signaled within one of:
    a sequence parameter set (SPS) message,
    a picture parameter set (PPS) message,
    a slice header (SH) message,
    a coding unit (CU) message,
    a picture header (PH) message, and
    a supplemental enhancement information (SEI) message.

12. An apparatus for coding a depth lookup table, the depth lookup table comprising depth values of a 3D video sequence, the depth values being constrained within a range, the apparatus comprising:
    a partitioner configured for partitioning the range into a plurality of sub-ranges, a first sub-range comprising a first set of the depth values and a second sub-range comprising a second set of the depth values; and
    a coder configured for coding the depth values of each of the first and second sub-ranges to the depth lookup table according to a predetermined coding rule,
    wherein for a depth lookup table belonging to a predetermined group of depth lookup tables,
       the range is partitioned into a fixed number of sub-ranges if a coding type indicates non-adaptive coding; and
       the range is partitioned into a selectable number of sub-ranges if the coding type indicates adaptive coding.

13. A method for providing a representation of a depth lookup table associated to at least a part of a 3D picture, the method comprising:
    providing the representation of the depth lookup table based on depth value information comprised in a first sub-range representation of the representation of the depth lookup table, which comprises depth value information associated to a first sub-range of a range of depth value information of the representation of the depth lookup table, and based on depth value information comprised in a second sub-range representation of the representation of the depth lookup table, which comprises depth value information associated to a second sub-range of the range of depth value information of the representation of the depth lookup table;
    receiving a bitstream comprising the first sub-range representation of the representation of the depth lookup table and the second sub-range representation of the representation of the depth lookup table separately multiplexed; and
    demultiplexing the bitstream to obtain the first sub-range representation of the representation of the depth lookup table and the second sub-range representation of the representation of the depth lookup table.

14. The method according to claim 13, further comprising:
    analyzing a multi-range indicator comprised in a coding unit coding level, a slice header coding level, a picture header coding level, a picture parameter set coding level, a SPS coding level or a SEI coding level, the multi-range indicator indicating whether the representation of the depth lookup table is encoded as a plurality of separate sub-range representations; and
    providing, in case the multi-range indicator indicates that the representation of the depth lookup table is encoded as a plurality of sub-range representations, the representation of the depth lookup table associated to at least the part of the 3D picture based on depth value information comprised in the plurality of sub-range representations of the representation of the depth lookup table, the plurality of sub-range representations of the representation of the depth lookup table comprising at least the first sub-range representation and the second sub-range representation of the representation of the depth lookup table.

15. The method according to claim 13, further comprising:
  analyzing a multi-range indicator comprised in a coding unit coding level, a slice header coding level, a picture header coding level, a picture parameter set coding level, a SPS coding level or a SEI coding level, the type indicator indicating whether the representation of the depth lookup table is encoded as a plurality of sub-range representations and/or indicating the number of ranges or sub-ranges the representation of the depth lookup table is encoded as; and
  providing, in case the multi-range indicator indicates that the representation of the depth lookup table is encoded as multiple sub-range representations, the representation of the depth lookup table associated to at least the part of the 3D picture representation based on depth value information comprised in the plurality of sub-range representations of the representation of the depth lookup table, the plurality of sub-range representations of the representation of the depth lookup table comprising at least the first sub-range representation and the second sub-range representation of the representation of the depth lookup table.

16. A method for providing a representation of a depth lookup table associated to at least a part of a 3D picture, the method comprising:
  providing the representation of the depth lookup table based on depth value information comprised in a first sub-range representation of the representation of the depth lookup table, which comprises depth value information associated to a first sub-range of a range of depth value information of the representation of the depth lookup table, and based on depth value information comprised in a second sub-range representation of the representation of the depth lookup table, which comprises depth value information associated to a second sub-range of the range of depth value information of the representation of the depth lookup table,
  wherein the representation of the depth lookup table is a binary string representation of the depth lookup table, wherein the depth value information comprises a string of binary values, wherein a position of a binary value of the string of binary values in the string of binary values is associated to a depth value of the corresponding depth lookup table and wherein a length of the string of binary values corresponds to a size of the range of depth value information; and
  wherein the first sub-range representation of the representation of the depth lookup table is a first sub-range of the binary string representation of the depth lookup table, and wherein the second sub-range representation of the representation of the depth lookup table is a second sub-range of the binary string representation of the depth lookup table.

17. The method according to claim 16, wherein the first sub-range of binary values of the binary string representation of the depth lookup table and the second sub-range of binary values of the binary string representation of the depth lookup table are separated by at least one binary value of the binary string representation of the depth lookup table.

18. The method according to claim 16, further comprising:
  adding, based on a predetermined reconstruction algorithm, to the binary string representation of the depth lookup table binary values not comprised in the first sub-range representation of the representation of the depth lookup table and not comprised in the second sub-range representation of the representation of the depth lookup table.

19. The method according to claim 16, wherein a first binary value of a binary value of the string of binary values indicates the occurrence of the depth value in the corresponding reference lookup table.

20. The method according to claim 16,
  wherein the representation of the depth lookup table is a difference binary string representation of the depth lookup table, wherein a first binary value of a binary value of the string of binary values of the difference binary string representation indicates the occurrence of a depth value in the depth lookup table, which does not occur in a reference depth lookup table, and/or indicates the occurrence of a depth value occurring in the reference lookup table, which does not occur in the depth lookup table,
  wherein a length of the string of binary values corresponds to a size of the range of depth value information, and
  wherein the first sub-range representation of the representation of the depth lookup table is a first sub-range of the difference binary string representation of the depth lookup table, and wherein the second sub-range representation of the representation of the depth lookup table is a second sub-range of the difference binary string representation of the depth lookup table.

21. The method according to claim 20, further comprising:
  providing a binary string representation of the depth lookup table associated to at least the part of the 3D picture by adding to the binary string representation of the depth lookup table depth value information, which is present in the difference binary string representation of the depth lookup table and which is not present in a binary string representation of the reference depth lookup table; and by copying to the binary string representation of the depth lookup table depth value information of the binary string representation of the reference DLT, which is not present in the difference binary string representation of the depth lookup table.

22. The method according to claim 20, further comprising: providing a binary string representation of the depth lookup table associated to at least the part of the 3D picture by applying one of a logical XOR operation and a logical XNOR operation to the binary values of the difference binary string representation and the binary values of the reference binary string representation associated to the same depth values to obtain binary values of the binary string representation of the depth lookup table.

23. The method according to claim 20, wherein the difference binary string representation of the depth lookup table corresponds to a range constrained bit map (RCBM) coded difference binary string, and the binary string representation of the reference depth lookup table corresponds to a RCBM coded reference binary string.

24. The method according to claim 20, wherein the reference depth lookup table is depth lookup table associated
  to other 3D pictures associated to other views,
  to other 3D pictures associated to other views and/or time instances of a 3D video sequence comprising the 3D picture, or
  to other parts of the 3D picture, for a corresponding part of another 3D picture associated to other views and/or time instances, wherein a part of the 3D picture comprises a slice, a coding unit, a coding block, or a macro block of the 3D picture.

25. The method according to claim 20, further comprising:
analyzing a difference coding indicator, for example comprised in a coding unit coding level, a slice header coding level, a picture header coding level, a picture parameter set coding level, a SPS coding level or a SEI coding level, the difference coding indicator indicating a type of difference encoding and/or the reference depth lookup table used for obtaining the difference binary string representation of the depth lookup table;
selecting a binary string representation of a reference depth lookup table according to the type indicator; and
providing the representation of a depth lookup table associated to at least the part of the 3D picture.

26. An apparatus comprising a processor for performing the method according to claim 13.

27. An apparatus comprising a processor for performing the method according to claim 1.

28. An apparatus comprising a processor for performing the method according to claim 16.

* * * * *